United States Patent
Ikeda

(10) Patent No.: US 8,256,720 B2
(45) Date of Patent: Sep. 4, 2012

(54) SMART VORTEX GENERATOR, AND AIRCRAFT, VESSEL, AND ROTARY MACHINE BEING EQUIPPED WITH THE SAME

(75) Inventor: Tadashige Ikeda, Nagoya (JP)

(73) Assignee: National University Corporation Nagoya University, Nagoya-shi (JP)

( * ) Notice: Subject to any disclaimer, the term of this patent is extended or adjusted under 35 U.S.C. 154(b) by 1192 days.

(21) Appl. No.: 12/088,771

(22) PCT Filed: Dec. 28, 2005

(86) PCT No.: PCT/JP2005/024290
§ 371 (c)(1),
(2), (4) Date: Mar. 31, 2008

(87) PCT Pub. No.: WO2007/077620
PCT Pub. Date: Jul. 12, 2007

(65) Prior Publication Data
US 2008/0217485 A1    Sep. 11, 2008

(51) Int. Cl.
*B64C 21/00* (2006.01)
*B64C 23/06* (2006.01)
(52) U.S. Cl. .................... 244/204.1; 244/199.3
(58) Field of Classification Search ............. 244/204.1, 244/199.1–199.4
See application file for complete search history.

(56) References Cited

U.S. PATENT DOCUMENTS

| | | | |
|---|---|---|---|
| 2,740,596 A * | 4/1956 | Lee | 244/204.1 |
| 2,764,373 A | 9/1956 | Anderson et al. | |
| 5,058,837 A | 10/1991 | Wheeler | |
| 5,755,408 A * | 5/1998 | Schmidt et al. | 244/204 |
| 6,105,904 A | 8/2000 | Lisy et al. | |
| 6,220,550 B1 * | 4/2001 | McKillip, Jr. | 244/215 |
| 6,427,948 B1 * | 8/2002 | Campbell | 244/204.1 |
| 7,753,316 B2 * | 7/2010 | Larssen et al. | 244/199.4 |
| 7,878,457 B2 * | 2/2011 | Narramore | 244/200.1 |

(Continued)

FOREIGN PATENT DOCUMENTS

JP    58 158869    10/1983
(Continued)

OTHER PUBLICATIONS

Office Action issued May 19, 2011 in Japan Application No. 2007-528908 (With Partial English Translation).

*Primary Examiner* — Tien Dinh
(74) *Attorney, Agent, or Firm* — Oblon, Spivak, McClelland, Maier & Neustadt, L.L.P.

(57) ABSTRACT

A smart vortex generator including a main body, disposed on a body surface, such as a main wing of aircraft, making a boundary to a flow of fluid, and at least a part of which includes a shape memory alloy. A form of the main body, depending on a temperature increment/decrement of the fluid, changes between (1) a first form capable of suppressing a flow separation by a vortex generation and (2) a second form capable of suppressing a turbulent flow, by a phenomenon that the shape memory alloy undergoes a phase transformation between a high-temperature-side stable phase and a low-temperature-side stable phase. The smart vortex generator demonstrates a multi-directional characteristic depending on a temperature change, such that no energy supply from the outside is required. The structure is simple, and repairs and maintenance as well as installation to existing wings are easy.

21 Claims, 15 Drawing Sheets

U.S. PATENT DOCUMENTS 7,900,871 B2 * 3/2011 Rincker et al. ............ 244/134 A

FOREIGN PATENT DOCUMENTS

| | | |
|---|---|---|
| JP | 63 106192 | 7/1988 |
| JP | 3 285038 | 12/1991 |
| JP | 5 16892 | 1/1993 |
| JP | 5 215063 | 8/1993 |
| JP | 8 309671 | 11/1996 |
| JP | 2005 336534 | 12/2005 |

* cited by examiner (a)

(b)

SMART VORTEX GENERATOR, AND AIRCRAFT, VESSEL, AND ROTARY MACHINE BEING EQUIPPED WITH THE SAME

TECHNICAL FIELD

The present invention relates to a smart vortex generator, which is placed on a body surface making a boundary to a flow of fluid, on a wing surface of aircraft, on a hull surface of vessel or on a surface of wing being installed to the hull, and on a wing surface of rotary machine, and the like, for instance, thereby suppressing a flow separation occurring on the body surface; and an aircraft, a vessel and a rotary machine which are equipped with the same; more particularly, it relates to a smart vortex generator, at least a part of which includes a shape memory alloy or a super-elastic alloy, and which demonstrates a multi-directional characteristic depending on a temperature change of fluid or a change of fluidic force; and an aircraft, a vessel and a rotary machine which are equipped with the same.

BACKGROUND ART

A wing of aircraft is designed so that the wing shape becomes optimum upon cruising which takes the longest time in flight routes. Namely, the wing is designed so that, upon cruising, a lift force can be obtained to the extent of the weight at high airspeeds; and a drag becomes as small as possible.

Meanwhile, a lift force becomes larger as an airspeed, and an angle of attack or an airfoil camber becomes larger. Accordingly, during low-airspeed flight at the time of takeoff and landing or at the time of turning, a wing's angle of attack is made larger or a wing shape is bent greatly at a hinge portion, with which a wing is provided, in order to obtain a higher lift force. However, when the wing's angle of attack increases beyond the limit, or when the airfoil camber becomes larger too much, a flow separates from a wing surface so that a drag becomes larger and additionally no sufficient lift force can be obtained, and thereby there is a fear that the maneuverability might degrade.

Hence, in order to suppress the flow separation that occurs at a wing surface upon takeoff and landing when a wing's angle of attack or an airfoil camber becomes larger, a vortex generator is placed on a wing surface of aircraft. The vortex generator generates a longitudinal vortex from a certain position on the wing surface, mixes a larger-momentum flow on the outer side of the boundary layer with a slow flow on the wing surface, and thereby increases the momentum of the flow on the wing surface to suppress the occurrence of the separation.

An ordinary vortex generator, which have been employed in aircraft, comprises a plate-shaped body with a rectangular or trapezoidal shape, and the like, and is placed in such a state that the plate surface is directed obliquely so that a flow runs into the plate surface and additionally the plate surface rises substantially perpendicularly with respect to a wing surface. Note that, in large-sized aircraft applications, the length of the rising plate-shaped body is about 55-75 mm, the height is about 20-23 mm, and the thickness is about 2 mm; and that these plate-shaped bodies are placed forward on a control surface at intervals in the lateral direction (or in the span direction of the wing) in a quantity of a plurality of pieces.

By the way, while a vortex generator demonstrates such a function that it suppresses a flow separation from a wing surface upon takeoff and landing when a wing's angle of attack or an airfoil camber becomes larger, there is a disadvantage that, upon cruising when a wing's angle of attack or an airfoil camber becomes smaller, it has disturbed a flow on a wing surface by means of vortexes generated by the vortex generator and has enlarged a drag by means of turbulent flow. The phenomenon that, upon cruising which takes the longest time in flight routes, a drag has been enlarged by means of the vortex generator results in a greater problem from the viewpoint of the maneuvering performance and fuel consumption of aircraft.

Hence, techniques have been known, techniques which adjust the modes of vortex generators depending on flying circumstances.

For example, in Patent Literature No. 1 (or Japanese Unexamined Patent Publication (KOKAI) Gazette No. 5-16,892), a separation controlling apparatus is disclosed; as illustrated in FIG. 18, it is equipped with: a sensor 82 for detecting the states of fluidic flow on a wing surface 81 of a wing 80, the flow rates of fluid, vortexes which occur in fluidic flows; data-processing means 83 comprising a CPU, or the like, which analyzes the states of separation based on sensor signals and additionally outputs control signals depending on the states of separation; driving means 84, such as a piezoelectric actuator, or the like, which is actuated by the control signals from the data-processing means 83; and a vortex generator 86 whose leading-end position 85, with respect to the wing surface 81 making a boundary to flows, is made ascendable and descendable by means of the driving means 84.

In this separation controlling apparatus, the states of fluidic flow on the wing surface 81, and the like, are detected with the sensor 82; and then the driving means 84 is actuated by means of the control signals from the data-processing means 83, control signals which depend on the states of separation based on the sensor signals; and thereby the leading-end position 85 of the vortex generator, which is disposed with respect to the wing surface 81, is moved and adjusted. Thus, when no separation occurs on the wing surface 81, the leading-end position 85 of the vortex generator 86 is put into such a state that it retracts within the wing 80; on the other hand, when separations occur on the wing surface 81, the leading-end position 85 of the vortex generator 86 is put into such a state that it protrudes from the wing surface 81 by a predetermined magnitude; and thereby it is possible to control the flow separations optimally.

Moreover, in Patent Literature No. 2 (or U.S. Pat. No. 6,427,948 B1), a vortex generator is disclosed; as illustrated in FIG. 19, it is equipped with a body 90, a blade spring 91 which is formed as a bow shape in its natural state, and a heating element 92 by means of electric resistance. The body 90 is constituted of a rectangle-shaped base portion 93, which is fixed onto a wing surface, and a rectangle-shaped fin portion 94, which is connected with a side surface on a one-end (or front-end) side of the base portion 93 integrally and additionally which has a rise surface rising from the base portion 93 perpendicularly. And, the fin portion 94 comprises a shape memory alloy, and a shape-memorized configuration of this shape memory alloy is not a bow shape, but is such a configuration that it extends linearly so that the rise surface of the fin portion 94 becomes flat. Moreover, the fin portion 94 is made deformable into a bow shape so that, at a temperature of the transformation finish temperature or less, it follows along the bow shape of the blade spring 91. Accordingly, at a temperature of the transformation finish temperature or less, the blade spring 91's engagement clip portions 91a and 91b are fitted into the fin portion 94's front edge 94a and rear edge 94b, and thereby the fin portion 94 is formed as a configuration, which is deformed to such a bow shape that follows along the bow shape of the blade spring 91, by means of the blade spring

91's spring force. Moreover, the heating element 92, to which electricity is supplied through conducting wires 95 and 96 and which heats the fin portion 94 by means of electric resistance, is bonded onto the rise surface of the fin portion 94.

Accordingly, in this vortex generator, since the fin portion 94 is formed as a bow shape by means of the blade spring 91's spring force when being a transformation finish temperature or less of the shape memory alloy, it generates vortexes on the wing surface to suppress the flow separations. On the other hand, the fin portion 94 is turned into the shape-memorized linearly-extended configuration against the blade spring 91's spring force when being heated to a reverse transformation finish temperature or more by means of the heating element 92. Since the linearly-extended fin portion 94 extends parallelly along the flow of fluid, no vortex arises on the wing surface so that it is possible to restrain the drag enlargement resulting from turbulent flows. Therefore, in this vortex generator, the fin portion 94's shape is changed by controlling the electricity supply to the heating element 92, and thereby it is possible to control the flow separations optimally.

Note that, in this vortex generator, the fin portion 94 returns to the bow shape by means of the blade spring 91's spring force when the electricity supply to the heat element 92 is broken off, due to the electric-system failures, and the like, so that the temperature of the fin portion 94 drops below the transformation finish temperature. Accordingly, in this vortex generator, even if no electricity cannot be supplied to the heating element 92 because of certain reasons, since it is possible to have the separation suppressing function of the fin portion 94 demonstrate by turning the fin portion 94 into the bow shape by means of the blade spring 91, a fail-safe mechanism works. However, in this instance, since the fin portion 94 has come to generate vortexes on the wing surface even upon cruising, it brings about the enlargement of drag.

However, according to the prior art set forth in aforementioned Patent Literature No. 1, the sensor 82, which detects the states of fluidic flow, and the like, on the wing surface 81, the data-processing means 83, which comprises a CPU, or the like, and the driving means 84, such as a piezoelectric actuator, or the like, which actuates the vortex generator 86, are required.

Moreover, according to the prior art set forth in aforementioned Patent Literature No. 2, the temperature of the fin portion 94, which comprises a shape memory alloy, is adjusted by means of controlling the electricity supply to the heating element 92, and thereby the form of the fin portion 94 is changed. Further, in this prior art, when trying to change the form of the fin portion 94 securely between upon takeoff and landing and upon cruising, a sensor for judging the timing of the change, and data processing means therefor have come to be needed.

Accordingly, the techniques set forth in aforementioned Patent Literature Nos. 1 and 2 require an energy supply from the outside, and are consequently associated with such problems that their apparatuses are complicated structurally; failures are likely to occur in the electric systems, and the like; and moreover their repairs and maintenance as well as their installations to existing wings are troublesome.

DISCLOSURE OF THE INVENTION

The present invention is one which has been done in view of the aforementioned circumstances, and its technical assignment to be solved is to provide a smart vortex generator, which is a vortex generator exhibiting a multi-directional characteristic depending on a temperature change, and the like; in which no energy supply from the outside is required; whose structure is simple; in which failures are less likely to occur; which makes the repairs and maintenance as well as the installation to existing wings, and so forth, easy; and to provide an aircraft, a vessel and a rotary machine which are equipped with the same.

A smart vortex generator according to the present invention, which solves the aforementioned assignment, is one which is a smart vortex generator being placed on a body surface, which makes a boundary to a flow of fluid, thereby suppressing a flow separation, which occurs at the body surface, and thereby demonstrating a multi-directional characteristic depending on a temperature change of the fluid, and is one which is characterized in that: it is equipped with a main body being disposed on said body surface, at least a part of the main body comprising a shape memory alloy; and it is configured so that, depending on a temperature increment/decrement of said fluid, a form of said main body changes between a first form, which is capable of suppressing a flow separation by means of a vortex generation, and a second form, which is capable of suppressing a turbulent flow, by means of a phenomenon that said shape memory alloy undergoes a phase transformation between a high-temperature-side stable phase, which is stable on a higher temperature side, and a low-temperature-side stable phase, which is stable on a lower temperature side.

Here, the "shape memory alloy" is an alloy, which exhibits a super-elastic effect and a shape memory effect; in this shape memory effect, one-way shape memory effects, and multi-directional shape memory effects, such as a two-way shape memory effect, and the like, are included. Note that the super-elastic effect (or the shape memory alloy's super-elastic effect) set forth herein refers to such a phenomenon that it undergoes a great elastic deformation while being accompanied by a phase transformation of the shape memory alloy (or it undergoes a super-elastic deformation in an elastic strain magnitude of 1% or more).

Moreover, "demonstrating a multi-directional characteristic depending on a temperature change of the fluid" refers to such a phenomenon that it operates repetitively automatically in a plurality of modes in accordance with a temperature increment/decrement of the fluid; and it means to include the case of utilizing a combination of a shape memory alloy's one-way shape memory effect, and a bias force, which is indispensable in order to have this shape memory alloy demonstrate a multi-directional characteristic, and the case of utilizing a shape memory alloy's multi-directional shape memory effect. Note that the "temperature of the fluid" set forth herein refers to a fluidic temperature around the main body in such a state that the smart vortex generator according to the present invention is placed on the body surface to be put into service (or in service); namely, it refers to the temperature of gas or liquid to which the main body is exposed (more concretely, an air temperature or water temperature, and the like). Moreover, the "repetitive operation" set forth herein refers to a phenomenon that said main body changes to a plurality of forms repetitively; for example, to a phenomenon that the form of said main body changes between said first form and said second form repetitively.

Moreover, in the "high-temperature-side stable phase," an austenitic phase, which is stable upon being higher temperature and/or upon being lower load, is included, for instance; and, in the "low-temperature-side stable phase," a martensitic phase, which is stable upon being lower temperature and/or upon higher load, is included, for instance.

Further, the "first form, which is capable of suppressing a flow separation by a vortex generation" means a form of said main body, form which is designed so that it is capable of inhibiting a flow from separating from said body surface by means of generating vortexes on the body surface; and, in this "first form," one form, which is optimum in design, and one form, which is satisfactory in design, and a plurality of forms, which are satisfactory in design, are included. Namely, in this "first form," a plurality of forms, which change continuously or stepwise depending on a temperature increment/decrement of said fluid, are included. Likewise, the "second form, which is capable of suppressing a turbulent flow" means a form of said main body, form which is designed so that it is capable of inhibiting a turbulent flow from occurring on said body surface; and, in this "second form," one form, which is optimum in design, and one form, which is satisfactory in design, and a plurality of forms, which are satisfactory in design, are included. Namely, in this "second form," a plurality of forms, which change continuously or stepwise depending on a temperature increment/decrement of said fluid, are included.

Moreover, "being capable of suppressing a turbulent flow" is such a meaning that the main body changes from the first form to the second form, and thereby it is possible to decrease vortexes or make vortexes disappear, vortexes which are generated by the main body being put into the first form.

In addition, "a form of the main body changes between a first form and a second form by means of a phenomenon that the shape memory alloy undergoes a phase transformation between a high-temperature-side stable phase and a low-temperature-side stable phase" in "a form of said main body changes between a first form, which is capable of suppressing a flow separation by means of a vortex generation, and a second form, which is capable of suppressing a turbulent flow, by means of a phenomenon that said shape memory alloy undergoes a phase transformation between a high-temperature-side stable phase, which is stable on a higher temperature side, and a low-temperature-side stable phase, which is stable on a lower temperature side" refers to such a phenomenon that the shape memory alloy transforms from the high-temperature-side stable phase to the low-temperature-side stable phase, and thereby the form of the main body changes from the first form to the second form and additionally the shape memory alloy undergoes a reverse transformation from the low-temperature-side stable phase to the high-temperature-side stable phase, and thereby the form of the main body changes from the second form to the first form (i.e., corresponding to a later-described first aspect); or the shape memory alloy undergoes a reverse transformation from the low-temperature-side stable phase to the high-temperature-side stable phase, and thereby the form of the main body changes from the first form to the second form and additionally the shape memory alloy transforms from the high-temperature-side stable phase to the low-temperature-side stable phase, and thereby the form of the main body changes from the second form to the first form (i.e., corresponding to a later-described second aspect).

In this smart vortex generator, by means of the arrangement that at least a part of the main body comprises a shape memory alloy; and, by means of a phenomenon that this shape memory alloy undergoes a phase transformation between the high-temperature-side stable phase and the low-temperature-side stable phase depending on a temperature increment/decrement of the fluid, a form of said main body changes between the first form, which is capable of suppressing a flow separation by means of a vortex generation, and a second form, which is capable of suppressing a turbulent flow.

In the case where the shape memory alloy is one which exhibits a one-way shape memory effect, it is possible to exemplify the following two types as the aspect in which such a shape memory alloy undergoes a phase transformation between the high-temperature-side stable phase and the low-temperature-side stable phase by means of a temperature increment/decrement of fluid, and thereby the main body changes between the first form and the second form.

Specifically, the following aspects are available: (1) a first aspect, when a fluidic temperature around the main body is a reverse transformation finish temperature (or an austenitic transformation finish temperature, for instance) or higher of the shape memory alloy, which is put in such a state that it receives an external load acting onto the shape memory alloy in service, the main body turns into the first form, and additionally, when the fluidic temperature around the main body is a transformation finish temperature (or a martensitic transformation finish temperature, for instance) or lower of the shape memory alloy, which is put in such a state that it receives said external load, the main body turns into the second form, and thereby the main body changes between the first form and the second form repetitively depending on a temperature increment/decrement of fluid; and (2) a second aspect, when a fluidic temperature around the main body is a transformation finish temperature (or a martensitic transformation finish temperature, for instance) or lower of the shape memory alloy, which is put in such a state that it receives said external load, the main body turns into the first form, and additionally, when the fluidic temperature around the main body is a reverse transformation finish temperature (or an austenitic transformation finish temperature, for instance) or higher of the shape memory alloy, which is put in such a state that it receives said external load, the main body turns into the second form, and thereby the main body changes between the first form and the second form repetitively depending on a temperature increment/decrement of fluid.

Here, in the present description, the "transformation finish temperature" means, even when decreasing a temperature below it, a temperature at which the transformation of the shape memory alloy does not develop, or a temperature at which the shape memory ally reaches a predetermined configurational range; and moreover the "reverse transformation finish temperature" means, even when increasing a temperature above it, a temperature at which the transformation of the shape memory alloy does not develop, or a temperature at which the shape memory ally reaches a predetermined configurational range.

In the case where the shape memory alloy is one which exhibits a two-way shape memory effect, it is possible to exemplify the following two types as the aspect in which such a shape memory alloy undergoes a phase transformation between the high-temperature-side stable phase and the low-temperature-side stable phase by means of a temperature increment/decrement of fluid, and thereby the main body changes between the first form and the second form.

Specifically, the following aspects are available: (1) a first aspect, when a fluidic temperature around the main body is a reverse transformation finish temperature (or an austenitic transformation finish temperature, for instance) or more of the shape memory alloy, which is put in such a state that it receives said external load, the main body turns into the first form, a high-temperature-side shape-memorized configuration, and additionally, when the fluidic temperature around the main body is a transformation finish temperature (or a martensitic transformation finish temperature, for instance) or less of the shape memory alloy, which is put in such a state that it receives said external load, the main body turns into the second form, a low-temperature-side shape-memorized configuration, and thereby the main body changes between the first form and the second form repetitively depending on a temperature increment/decrement of fluid; and (2) a second aspect, when a fluidic temperature around the main body is a transformation finish temperature (or a martensitic transformation finish temperature, for instance) or less of the shape memory alloy, which is put in such a state that it receives said external load, the main body turns into the first form, a low-temperature-side shape-memorized configuration, and additionally, when the fluidic temperature around the main body is a reverse transformation finish temperature (or an austenitic transformation finish temperature, for instance) or more of the shape memory alloy, which is put in such a state that it receives said external load, the main body turns into the second form, a high-temperature-side shape-memorized configuration, and thereby the main body changes between the first form and the second form repetitively depending on a temperature increment/decrement of fluid.

Note that, as for a preferable aspect when applying the smart vortex generator according to the present invention to aircraft, it is possible to name said first aspect. In this case, as described in later-described embodiment modes, it is possible to employ a shape memory alloy, which is obtained by adjusting the alloy composition (or components or combining ratios) or heat treatment conditions, and the like, so that the main body turns into the first form upon the takeoff and landing of aircraft; and additionally so that the main body turns into the second form upon the cruising of aircraft; or so that an assumed temperature in low altitude upon takeoff and landing (or a high-temperature-side assumed air temperature) is said reverse transformation finish temperature or more; and additionally so that an assumed temperature in high altitude upon cruising (or cruising high altitude) (or a low-temperature-side assumed air temperature) is said transformation finish temperature or less. Note that, as for this assumed temperature, it is possible to set it at a certain temperature in each of the high-temperature-side and low-temperature-side temperatures; or it is possible as well to set it to fall within a certain temperature range therein.

Thus, in this smart vortex generator, the multi-directional characteristic of the smart vortex generator is demonstrated using the temperature change of fluid, which is present around the main body, as a controlling input. Namely, this smart vortex generator has turned into a so-called smart structure that detects environments, in which it is put, by itself; judges by itself; and changes to optimum shapes by itself. Moreover, it is not necessary to supply energy from the outside in order to cause the phase transformation of the shape memory alloy, and accordingly an electric apparatus as energy-supplying means, and driving means for vortex generator become unnecessary.

Therefore, the smart vortex generator according to the present invention is such that the structure is simple; failures are less likely to occur; and the repairs and maintenance as well as the installation to existing wings, and the like, become easy.

In a preferable aspect, the smart vortex generator according to the present invention is configured so that said shape memory alloy exhibits a one-way shape memory effect; it is further equipped with auxiliary-force giving means being disposed in a predetermined relationship with respect to said main body, the auxiliary-force giving means giving a predetermined auxiliary force, as at least a part of a bias force required for the demonstration of said multi-directional characteristic, to said shape memory alloy; and it is configured so that, when a temperature of said fluid reaches a transformation start temperature of the shape memory alloy in the temperature decrement process, shape memory alloy which is put in such a state that it receives an external load acting onto said shape memory alloy in service, the shape memory alloy starts transforming from said high-temperature-side stable phase to said low-temperature-side stable phase; and so that, when the temperature of the fluid reaches a reverse transformation start temperature of the shape memory alloy in the temperature increment process, shape memory alloy which is put in such a state that it receives the external load, the shape memory alloy starts transforming reversely from said low-temperature-side stable phase to the high-temperature-side stable phase.

Here, the "bias force" means such a force, which is given to the main body from the outside as what is necessary and indispensable for said main body, which includes a shape memory alloy exhibiting a one-way shape memory effect in at least a part thereof, to demonstrate a multi-directional characteristic. Moreover, as for the "auxiliary force" which the auxiliary-force giving means gives to the shape memory alloy, elastic forces such as spring forces, forces, which are given by weights, and the like, and fluidic forces such as pneumatic pressures and hydraulic pressure, which pumps, and so forth, generate, are included, for instance. Note that, as for said "bias force," fluidic forces, which are loaded onto the shape memory alloy from fluid around the main body inevitably when making use of the smart vortex generator according to the present invention, are included in addition to said "auxiliary force."

Moreover, the "external load acting onto said shape memory alloy in service" means all loads that act onto the shape memory alloy, which constitutes the main body when making use of the smart vortex generator according to the present invention, from the outside; and, as for this "external load," said auxiliary force, and fluidic forces, which are loaded thereonto from fluid around the main body inevitably when making use of it, are included in the case of the shape memory alloy exhibiting a one-way shape memory effect; and fluidic forces, which are loaded thereonto from fluid around the main body inevitably when making use of it, and supplementary forces (or elastic forces, fluidic pressures, or forces which are given by weights, for instance), which are loaded thereonto supplementally if necessary, are included in the case of the shape memory alloy exhibiting a multi-directional shape memory effect.

Note that, when referring to "transformation" in the present description, it means a phase transformation from the high-temperature-side stable phase to the low-temperature-side stable phase, or a phase transformation from the low-load-side stable phase to the high-load-side stable phase; and, when referring to "reverse transformation," it means a phase transformation from the low-temperature-side stable phase to the high-temperature-side stable phase, or a phase transformation from the high-load-side stable phase to the low-load-side stable phase.

In this smart vortex generator, an auxiliary force resulting from the auxiliary-force giving means is utilized as at least a part of a bias force required for giving a multi-directional characteristic with respect to the main body, at least a part of which is constituted of a shape memory alloy exhibiting a one-way shape memory effect. Namely, in this smart vortex generator, an auxiliary force resulting from the auxiliary-force giving means is given to the shape memory alloy, which exhibits a one-way shape memory effect, as at least a part of the bias force. Accordingly, due to the balance between the shape memory alloy's stress-strain characteristic, which changes depending on a fluidic temperature, and the bias force, which includes the auxiliary force at least, the shape memory alloy undergoes a phase transformation to turn into the high-temperature-side stable phase or to turn into the low-temperature-side stable phase depending on a temperature increment/decrement of fluid. And, when the fluidic temperature decreases, since the shape memory alloy's yield stress (or transformation stress) lowers because of it, the main body's form changes from the first form to the second form, or changes from the second form to the first form, with the help of the bias force. Moreover, when making use of the smart vortex generator according to the present invention, a fluidic force is loaded onto the shape memory alloy from fluid around the main body inevitably. Consequently, in the case of utilizing this fluidic force, which is loaded thereonto inevitably in service, as a part of said bias force (or a force, which is necessary and indispensable for a shape memory alloy, which exhibits a one-way shape memory effect, to demonstrate a multi-directional characteristic), it is possible to securely maintain the main body to the first form or to the second form depending on a temperature increment/decrement of fluid by means of appropriately setting the auxiliary force, which is given to the shape memory alloy from the auxiliary-force giving means, and the stress-strain characteristic of the shape memory alloy, which exhibits a one-way shape memory effect, while taking the fluidic force's magnitude into account. Therefore, in this smart vortex generator, when the main body maintains the first form, it demonstrates a flow-separation suppressing function securely; and, when the main body maintains the second form, it demonstrates a turbulent-flow suppressing function securely.

In a preferable aspect, the smart vortex generator according to the present invention is configured so that, when the temperature of said fluid is a reverse transformation finish temperature or more of said shape memory alloy, which is put in such a state that it receives said external load, said main body maintains said first form; and so that, when the temperature of the fluid is a transformation finish temperature or less of the shape memory alloy, which is put in such a state that it receives said external load, the main body maintains said second form.

In this smart vortex generator, when the temperature of the fluid is on a higher temperature side, said reverse transformation finish temperature or more, the main body maintains the first form to demonstrate a flow-separation suppressing function; and, when the temperature of the fluid is on a lower temperature side, said transformation finish temperature or less, the main body maintains the second form to demonstrate a turbulent-flow suppressing function.

In a preferable aspect, the smart vortex generator according to the present invention is configured so that, when the temperature of said fluid is a transformation finish temperature or less of said shape memory alloy, which is put in such a state that it receives said external load, said main body maintains said first form; and so that, when the temperature of the fluid is a reverse transformation finish temperature or more of the shape memory alloy, which is put in such a state that it receives said external load, the main body maintains said second form.

In this smart vortex generator, when the temperature of the fluid is on a lower temperature side, said transformation finish temperature or less, the main body maintains the first form to demonstrate a flow-separation suppressing function; and, when the temperature of the fluid is on a higher temperature side, said reverse transformation finish temperature or more, the main body maintains the second form to demonstrate a turbulent-flow suppressing function.

In a preferable aspect, the smart vortex generator according to the present invention is such that said auxiliary-force giving means is equipped with an elastic body for giving an elastic force, as said auxiliary force, to said shape memory alloy.

Here, as for the "elastic body," metallic springs, and rubbery elastic bodies, such as elastic rubbers and thermoplastic elastomers, are included.

In this smart vortex generator, since the elastic body's elastic force is given to said shape memory alloy as said auxiliary force, it is possible to securely maintain the main body's form to the first form or to the second form by setting the elastic body's elastic force appropriately.

In a preferable aspect, the smart vortex generator according to the present invention is such that said elastic body comprises a blade spring.

In this smart vortex generator, since the blade spring's spring force is given to said shape memory alloy as said auxiliary force, it is possible to securely maintain the main body's form to the first form or to the second form by setting the blade spring's spring force appropriately. Moreover, being a blade spring makes it possible to easily adjust the spring force by setting its configuration, size, thickness or material appropriately, and additionally contributes more to simplifying the structure and making it maintenance free.

In a preferable aspect, the smart vortex generator according to the preset invention is configured so that said shape memory alloy exhibits a one-way shape memory effect; said main body is configured so that a fluidic force of said fluid, as a bias force required for the demonstration of said multi-directional characteristic, is given to said shape memory alloy from a predetermined direction; and it is configured so that, when the temperature of said fluid reaches a transformation start temperature of the shape memory alloy in the temperature decrement process, shape memory alloy which is put in such a state that it receives an external load acting onto said shape memory alloy in service, the shape memory alloy starts transforming from said high-temperature-side stable phase to said low-temperature-side stable phase; and so that, when the temperature of said fluid reaches a reverse transformation start temperature of the shape memory alloy in the temperature increment process, shape memory alloy which is put in such a state that it receives the external load, the shape memory alloy starts transforming reversely from the low-temperature-side stable phase to the high-temperature-side stable phase.

Here, the "fluidic force of the fluid" is a fluidic force of fluid around the main body, fluid which flows on a body surface in such a state that the smart vortex generator according to the present invention is placed on the body surface to be put into service (or in service); and means a fluidic force which is given with respect to the main body from a predetermined direction; but does not include a fluidic pressure that auxiliary-force giving means, which is disposed separately, generates the fluidic pressure as an auxiliary force.

Moreover, "so that a fluidic force of the fluid is given to said shape memory alloy from a predetermined direction" means that, using a fluidic force, which acts onto the main body from a predetermined direction, as a bias force, the main body's form is made changeable between the first form and the second form by means of the phenomenon that the shape memory alloy undergoes a phase transformation between the high-temperature-side stable phase and the low-temperature-side stable phase depending on a temperature increment/decrement of fluid.

In this smart vortex generator, a fluidic force of fluid, which flows on said body surface, is utilized as a bias force required for giving a multi-directional characteristic with respect to the main body, at least a part of which is constituted of a shape memory alloy exhibiting a one-way shape memory effect. Namely, in this smart vortex generator, said fluidic force is given to a shape memory alloy, which exhibits a one-way shape memory effect, as a bias force from a predetermined direction. Accordingly, due to the balance between the shape memory alloy's stress-strain characteristic, which changes depending on a fluidic temperature, and the fluidic force, which is given to the shape memory alloy as a bias force, the shape memory alloy undergoes a phase transformation to turn into the high-temperature-side stable phase or to turn into the low-temperature-side stable phase depending on a temperature increment/decrement of fluid. And, when the fluidic temperature decreases, since the shape memory alloy's yield stress (or transformation stress) lowers because of it, the main body's form changes from the first form to the second form, or changes from the second form to the first form, with the help of the fluidic force. Consequently, it is possible to securely maintain the main body to the first form or to the second form depending on a temperature increment/decrement of fluid by means of appropriately setting the fluidic force, which is given from fluid around the main body, fluid which flows on said body surface, to the shape memory alloy from a predetermined direction, and the stress-strain characteristic of the shape memory alloy, which exhibits a one-way shape memory effect. Therefore, in this smart vortex generator, when the main body maintains the first form, it demonstrates a flow-separation suppressing function securely; and, when the main body maintains the second form, it demonstrates a turbulent-flow suppressing function securely. Moreover, in this smart vortex generator, since said auxiliary force used as said bias force is not essential, it is not necessary to dispose said auxiliary-force giving means separately, and thereby it contributes more to simplifying the structure and making it maintenance free because of the reduction of constituent component parts.

In a preferable aspect, the smart vortex generator according to the present invention is configured so that, when the temperature of said fluid is a reverse transformation finish temperature or more of said shape memory alloy, which is put in such a state that it receives said external load, said main body maintains said first form; and so that, when the temperature of the fluid is a transformation finish temperature or less of the shape memory alloy, which is put in such a state that it receives the external load, the main body maintains said second form.

In this smart vortex generator, the main body maintains the first form to demonstrate a flow-separation suppressing function when the temperature of the fluid is on a higher temperature side, said reverse transformation finish temperature or more; and the main body maintains the second form to demonstrate a turbulent-flow suppressing function when the temperature of the fluid is on a lower temperature side, said transformation finish temperature or less.

In a preferable aspect, the smart vortex generator according to the present invention is configured so that, when the temperature of said fluid is a transformation finish temperature or less of said shape memory alloy, which is put in such a state that it receives said external load, said main body maintains said first form; and so that, when the temperature of the fluid is a reverse transformation finish temperature or more of the shape memory alloy, which is put in such a state that it receives the external load, the main body maintains said second form.

In this smart vortex generator, the main body maintains the first form to demonstrate a flow-separation suppressing function when the temperature of the fluid is on a lower temperature side, said transformation finish temperature or less; and the main body maintains the second form to demonstrate a turbulent-flow suppressing function when the temperature of the fluid is on a higher temperature side, said reverse transformation finish temperature or more.

In a preferable aspect, the smart vortex generator according to the present invention is configured so that said shape memory alloy exhibits a multi-directional shape memory effect; and the form of said main body changes between said first form and said second form by means of the multi-directional shape memory effect at least.

Here, said "multi-directional shape memory effect" is a characteristic which a shape memory alloy itself exhibits; and means that, without being given a bias force thereto from the outside, a shape memory alloy changes repetitively by itself automatically to a plurality of shape-memorized configurations by means of a phase transformation depending on a temperature change. For example, a two-way shape memory effect means that, without being given a bias force thereto from the outside, it changes repetitively to a configuration, which is shape-memorized on a higher temperature side, a reverse transformation finish temperature (or an austenitic transformation finish temperature, for instance) or more; and to another configuration, which is shape-memorized on a lower temperature side, a transformation finish temperature (or a martensitic transformation finish temperature) or less; in accordance with a temperature increment/decrement.

Moreover, "the form of said main body changes between said first form and said second form by means of the multi-directional shape memory effect at least" is a purport to the effect that, in addition to the case where the form of the main body changes between the first form and the second form by mans of the shape memory alloy's multi-directional shape memory effect and a fluidic force of fluid around the main boy, fluidic force which is loaded onto the shape memory alloy, which constitutes the main body, inevitably in service, it also includes the following case, that is, a case where the form of the main body changes between the first form and the second form by means of the shape memory alloy's multi-directional shape memory effect, said fluidic force and a supplementary force (or elastic forces, forces which are given by weights and the like, fluidic pressures, such as pneumatic pressures and water pressures, resulting from means which are disposed separately) which is loaded thereonto in order to change the form of the main body supplementally depending on need. Namely, when using one which exhibits a multi-directional shape memory effect as the shape memory alloy, it is advisable to dispose supplementary-force (elastic forces, forces which are given by weights and the like, and fluidic pressures, such as pneumatic pressures and water pressures) giving means, which is placed in a predetermined relationship with respect to the main body, depending on need.

In this smart vortex generator, the main body, at least a part of which is constituted of a shape memory alloy exhibiting a multi-directional shape memory effect, maintains one of the first form and the second form by means of the multi-directional shape memory effect at least when the temperature of the fluid is said reverse transformation finish temperature or more; and maintains the other one of the first form and the second form when the temperature of the fluid is the transformation finish temperature or less. Accordingly, it is not necessary to separately dispose bias-force giving means, such as said auxiliary-force giving means, and thereby it contributes more to simplifying the structure and making it maintenance free because of the reduction of constituent component parts.

In a preferable aspect of the smart vortex generator according to the present invention, it is configured so that, when the temperature of said fluid is a reverse transformation finish temperature or more of the shape memory alloy, which is put in such a state that it receives an external load acting onto said shape memory alloy in service, said main body maintains the first form, a high-temperature-side shape-memorized configuration; and so that, when the temperature of said fluid is a transformation finish temperature or less of the shape memory alloy, which is put in such a state that it receives the external load, the main body maintains the second form, a low-temperature-side shape-memorized configuration.

In this smart vortex generator, the main body maintains the first form to demonstrate a flow-separation suppressing function when the temperature of the fluid is on a higher temperature side, said reverse transformation finish temperature or more; and the main body maintains the second form to demonstrate a turbulent-flow suppressing function when the temperature of the fluid is on a lower temperature side, said transformation completion temperature or less.

In a preferable aspect of the smart vortex generator according to the present invention, it is configured so that, when the temperature of said fluid is a transformation finish temperature or less of said shape memory alloy, which is put in such a state that it receives said external load, said main body maintains the first form, a low-temperature-side shape-memorized configuration; and so that, when the temperature of said fluid is a reverse transformation finish temperature or more of the shape memory alloy, which is put in such a state that it receives said external load, the main body maintains the second form, a high-temperature-side shape-memorized configuration.

In this smart vortex generator, the main body maintains the first form to demonstrate a flow-separation suppressing function when the temperature of the fluid is on a lower temperature side, said transformation finish temperature or less; and the main body maintains the second form to demonstrate a turbulent-flow suppressing function when the temperature of the fluid is on a higher temperature side, said reverse transformation finish temperature or more.

Here, the smart vortex generator according to the present invention includes the following as well, that is, one which is a smart vortex generator being placed on a body surface, which makes a boundary to a flow of fluid, thereby suppressing a flow separation, which occurs at the body surface, and thereby demonstrating a multi-directional characteristic depending on a change of fluidic force of the fluid, and which is configured so that: it is equipped with a main body being disposed on the body surface so that said fluidic force is given thereto from a predetermined direction, at least a part of the main body comprising a shape memory alloy; and it is configured so that, depending on an increment/decrement of said fluidic force, a form of said main body changes between a first form, which is capable of suppressing a flow separation by means of a vortex generation, and a second form, which is capable of suppressing a turbulent flow, by means of a phenomenon that said shape memory alloy undergoes a super-elastic deformation while undergoing a phase transformation between a low-load-side stable phase, which is stable on a lower load side, and a high-load-side stable phase, which is stable on a higher load side.

"demonstrating a multi-directional characteristic depending on a change of fluidic force of the fluid" refers to such a phenomenon that it operates repetitively in a plurality of aspects automatically in accordance with the directions and increments/decrements of the fluidic force. Note that the "fluidic force" set forth herein refers to a fluidic force of fluid around the main body, fluid which flows on a body surface in such a state that the smart vortex generator according to the present invention is placed on the body surface to be put into service (or in service); namely, refers to a fluidic force of gas or liquid to which the main body is exposed.

Moreover, "so that the fluidic force is given thereto from a predetermined direction" is a purport to the effect that, depending on an increment/decrement of the fluidic force acting onto the main body from a predetermined direction, the shape memory alloy undergoes a super-elastic deformation while undergoing a phase transformation between the low-load-side stable phase and the high-load-side stable phase so as to make the form of the main body changeable between the first form and the second form. The "super-elastic deformation" in the shape memory alloy set forth herein is an elastic deformation accompanied by the phase transformation of the shape memory alloy, and means a great elastic deformation in which an elastic strain magnitude becomes 1% or more.

Note that, in the "low-load-side stable phase," austenitic phases, which are stable upon applying high temperatures and/or upon applying low loads, are included, for instance; and that, in the "high-load-side stable phase," martensitic phases, which are stable upon applying low temperatures and/or upon applying high loads, are included, for instance.

Moreover, since the "shape memory alloy," the "first form which is capable of suppressing a flow separation by means of a vortex generation," the "second form which is capable of suppressing a turbulent flow" and "being capable of suppressing a turbulent flow" are the same as those definitions on the above-described smart vortex generator, which demonstrates a multi-directional characteristic depending on a temperature change of fluid, the descriptions are omitted herein by making reference to their explanations.

Further, "a form of the main body changes between a first form and a second form by means of a phenomenon that the shape memory alloy undergoes a super-elastic deformation while undergoing a phase transformation between a low-load-side stable phase and a high-load-side stable phase" in "a form of said main body changes between a first form, which is capable of suppressing a flow separation by means of a vortex generation, and a second form, which is capable of suppressing a turbulent flow, by means of a phenomenon that said shape memory alloy undergoes a super-elastic deformation while undergoing a phase transformation between a low-load-side stable phase, which is stable on a lower load side, and a high-load-side stable phase, which is stable on a higher load side" refers to such a phenomenon that the shape memory alloy undergoes a super-elastic deformation while transforming from the low-load-side stable phase to the high-load-side stable phase, and thereby the form of the main body changes from the first form to the second form; and additionally the shape memory alloy undergoes a super-elastic deformation while transforming reversely from the high-load-side stable phase to the low-load-side stable phase, and thereby the form of the main body changes from the second form to the first form (i.e., corresponding to a later-described first aspect); or the shape memory alloy undergoes a super-elastic deformation while transforming reversely from the high-load-side stable phase to the low-load-side stable phase, and thereby the form of the main body changes from the first form to the second form; and additionally the shape memory alloy undergoes a super-elastic deformation while transforming from the low-load-side stable phase to the high-load-side stable phase, and thereby the form of the main body changes from the second form to the first form (i.e., corresponding to a later-described second aspect).

In this smart vortex generator, by means of the arrangement that at least a part of the main body comprises a shape memory alloy; and that the shape memory alloy undergoes a super-elastic deformation while undergoing a phase transformation between the low-load-side stable phase and the high-load-side stable phase depending on an increment/decrement of fluidic force acting onto the main body from a predetermined direction, a form of said main body changes between a first form, which is capable of suppressing a flow separation by means of a vortex generation, and a second form, which is capable of suppressing a turbulent flow.

In the case where the shape memory alloy is one which exhibits a one-way shape memory effect, it is possible to exemplify the following two types as the aspect in which such a shape memory alloy undergoes a super-elastic deformation while undergoing a phase transformation between the low-load-side stable phase and the high-load-side stable phase by means of an increment/decrement of fluidic force, and thereby the main body changes between the first form and the second form.

Specifically, the following aspects are available: (1) a first aspect, when a fluidic force of fluid, which acts onto the main body from a predetermined direction, is a reverse transformation finish stress (or an austenitic transformation finish stress, for instance) or less of the shape memory alloy, the main body turns into the first form, and additionally, when the fluidic force of fluid, which acts onto the main body from a predetermined direction, is a transformation finish stress (or a martensitic transformation finish stress, for instance) or more of the shape memory alloy, the main body turns into the second form, and thereby the main body changes between the first form and the second form repetitively depending on an increment/decrement of the fluidic force; and (2) a second aspect, when a fluidic force of fluid, which acts onto the main body from a predetermined direction, is a transformation finish stress (or a martensitic transformation finish stress, for instance) or more of the shape memory alloy, the main body turns into the first form, and additionally, when the fluidic force of fluid, which acts onto the main body from a predetermined direction, is a reverse transformation finish stress (or an austenitic transformation finish stress, for instance) or less of the shape memory alloy, the main body turns into the second form, and thereby the main body changes between the first form and the second form repetitively depending on an increment/decrement of the fluidic force.

Here, in the present description, the "reverse transformation finish stress" means, even when a stress in the shape memory alloy, stress which is generated by means of load thereto, decreases less than that, a stress at which the transformation of the shape memory alloy does not develop, or a stress at which the shape memory ally reaches a predetermined configurational range; and moreover the "transformation finish stress" means, even when a stress in the shape memory alloy, stress which is generated by means of load thereto, increases more than that, a stress at which the transformation of the shape memory alloy does not develop, or a stress at which the shape memory alloy reaches a predetermined configurational range.

Moreover, in the case where the shape memory alloy is one which exhibits a two-way shape memory effect, it is possible to exemplify the following two types as the aspect in which such a shape memory alloy undergoes a super-elastic deformation while undergoing a phase transformation between the low-load-side stable phase and the high-load-side stable phase by means of an increment/decrement of fluidic force, and thereby the main body changes between the first form and the second form.

Specifically, the following aspects are available: (1) a first aspect, when a fluidic force of fluid, which acts onto the main body from a predetermined direction, is a reverse transformation finish stress (or an austenitic transformation finish stress, for instance) or less of the shape memory alloy, the main body turns into the first form, a low-load-side shape-memorized configuration, and additionally, when the fluidic force of fluid, which acts onto the main body from a predetermined direction, is a transformation finish stress (or a martensitic transformation finish stress, for instance) or more of the shape memory alloy, the main body turns into the second form, a high-load-side shape-memorized configuration, and thereby the main body changes between the first form and the second form repetitively depending on an increment/decrement of the fluidic force; and (2) a second aspect, when a fluidic force of fluid, which acts onto the main body from a predetermined direction, is a transformation finish stress (or a martensitic transformation finish stress, for instance) or more of the shape memory alloy, the main body turns into the first form, a high-load-side shape-memorized configuration, and additionally, when the fluidic force of fluid, which acts onto the main body from a predetermined direction, is a reverse transformation finish stress (or an austenitic transformation finish stress, for instance) or less of the shape memory alloy, the main body turns into the second form, a low-load-side shape-memorized configuration, and thereby the main body changes between the first form and the second form repetitively depending on an increment/decrement of the fluidic force.

Note that, as for a preferable aspect when applying this smart vortex generator to aircraft, it is possible to name said first aspect. In this case, as described in later-described embodiment modes, it is possible to employ a shape memory alloy, which is obtained by adjusting the alloy composition (or components or combining ratios) or heat treatment conditions, and the like, so that the main body turns into the first form upon the takeoff and landing of aircraft; and additionally so that the main body turns into the second form upon the cruising of aircraft: for example, so that an assumed load at low airspeed upon takeoff and landing (or a low-load-side assumed load) is said reverse transformation finish stress or less; and additionally so that an assumed load (or a high-load-side assumed load) at high airspeed upon cruising (or cruising airspeed) is said reverse transformation finish load or more. Note that, as for this assumed load, it is possible to set it at a certain load in each of the low-load-side and high-load-side loads; or it is possible as well to set it within a certain load range.

Thus, in this smart vortex generator, the multi-directional characteristic of the smart vortex generator is demonstrated using the change of the fluidic force of fluid, which is present around the main body, as a controlling input. Namely, similarly to the above-described smart vortex generator which demonstrates a multi-directional characteristic depending on a temperature change of fluid, since this smart vortex generator, too, has turned into a so-called smart structure that detects environments, in which it is put, by itself; judges by itself; and changes to optimum shapes by itself, it is not necessary to supply energy from the outside in order to cause the phase transformation of the shape memory alloy, and accordingly an electric apparatus as energy-supplying means, and driving means for vortex generator become unnecessary.

Moreover, in this smart vortex generator which demonstrates a multi-directional characteristic depending on a change of fluidic force, since said auxiliary force used as said bias force is not essential, it is not necessary to dispose said auxiliary-force giving means separately, and thereby it contributes more to simplifying the structure and making it maintenance free because of the reduction of constituent component parts.

Here, in a preferable aspect, said smart vortex generator, which exhibits a multi-directional characteristic depending on a change of fluidic force, is configured so that, when said fluidic force reaches a transformation start stress of the shape memory alloy in an increment process, shape memory alloy which is put in such a state that it receives an external load acting onto said shape memory alloy in service, the shape memory alloy starts transforming from said low-load-side stable phase to said high-load-side stable phase; and so that, when said fluidic force reaches a reverse transformation start stress of the shape memory alloy in the decrement process, shape memory alloy which is put in such a state that it receives the external load, the shape memory alloy starts transforming reversely from the high-load-side stable phase to the low-load-side stable phase.

In this smart vortex generator, due to the balance between the shape memory alloy's stress-strain characteristic (or super-elastic characteristic) and the fluidic force, which is given to the shape memory alloy, the shape memory alloy undergoes a phase transformation to turn into the low-load-side stable phase or to turn into the high-load-side stable phase depending on an increment/decrement of the fluidic force. Namely, when the fluidic force becomes a reverse transformation finish stress smaller (or lower than that of the shape memory alloy, the shape memory alloy turns into the low-load-side stable phase; and, when the fluidic force becomes a transformation finish stress larger (or higher) than that of the shape memory alloy, the shape memory alloy turns into the high-load-side stable phase. Accordingly, it is possible to maintain the main body to the first form or to the second form depending on an increment/decrement of the fluidic force by means of appropriately setting the fluidic force, which is given to the shape memory alloy from fluid around the main body, fluid which flows on said body surface, and the stress-strain characteristic of the shape memory alloy.

Moreover, in a preferable aspect, the smart vortex generator which demonstrates a multi-directional characteristic depending on a change of said fluidic force is configured so that, when said fluidic force is a reverse transformation finish stress or less of said shape memory alloy, which is put in such a state that it receives said external load, said main body maintains said first form; and so that, when said fluidic force is a transformation finish stress or more of the shape memory alloy, which is put in such a state that it receives said external load, the main body maintains said second shape.

In this smart vortex generator, the main body maintains the first form to demonstrate a flow-separation suppressing function when the fluidic force is on a lower load side, said reverse transformation finish stress or less; and the main body maintains the second form to demonstrate a turbulent-flow suppressing function when the fluidic force is on a higher load side, said transformation finish stress or more.

In a preferable aspect, the smart vortex generator which demonstrates a multi-directional characteristic depending on a change of said fluidic force is configured so that, when said fluidic force is a transformation finish stress or more of said shape memory alloy, which is put in such a state that it receives said external load, said main body maintains said first form, and so that, when said fluidic force is a reverse transformation finish stress or less of the shape memory alloy, which is put in such a state that it receives said external load, the main body maintains said second shape.

In this smart vortex generator, the main body maintains the first form to demonstrate a flow-separation suppressing function when the fluidic force is on a higher load side, said transformation finish stress or more; and the main body maintains the second form to demonstrate a turbulent-flow suppressing function when the fluidic force is on a lower load side, said reverse transformation finish stress or less.

Note that, as described above, in the smart vortex generator which demonstrates a multi-directional characteristic depending on a change of said fluidic force, too, it is feasible to employ one which exhibits a multi-directional shape memory effect, such as a two-way shape memory effect, as the shape memory alloy.

Moreover, in the smart vortex generator which demonstrates a multi-directional characteristic depending on a change of said fluidic force, too, it is advisable to dispose supplementary-force (elastic forces, forces which are given by weights and the like, and fluidic pressures, such as pneumatic pressures and water pressures) giving means, which is placed in a predetermined relationship with respect to the main body, depending on need.

Further, the smart vortex generator according to the present invention includes the following as well, that is, one which is a smart vortex generator being placed on a body surface, which makes a boundary to a flow of fluid, thereby suppressing a flow separation, which occurs at the body surface, and thereby demonstrating a multi-directional characteristic depending on a change of fluidic force of the fluid, and which is configured so that: it is equipped with a main body being disposed on the body surface so that said fluidic force is given thereto from a predetermined direction, at least a part of the main body comprising a super-elastic alloy; and, depending on an increment/decrement of said fluidic force, a form of said main body changes between a first form, which is capable of suppressing a flow separation by means of a vortex generation, and a second form, which is capable of suppressing a turbulent flow, by means of a phenomenon that said super-elastic alloy undergoes a super-elastic deformation without being accompanied by any phase transformation.

Here, the "super-elastic alloy" in the present specification refers to an alloy which undergoes a super-elastic deformation in an elastic strain magnitude of 1% or more without being accompanied by any phase transformation; and which does not exhibit a shape memory effect. Here, the "super-elastic deformation" in the super-elastic alloy is an elastic deformation of the super-elastic alloy without being accompanied by any phase transformation, and means a great elastic deformation in which an elastic strain magnitude becomes 1% or more.

Moreover, "so that the fluidic force is given thereto from a predetermined direction" is a purport to the effect that, depending on an increment/decrement of the fluidic force acting onto the main body from a predetermined direction, the super-elastic alloy undergoes a super-elastic deformation without being accompanied by any phase transformation, thereby making the form of the main body so as to be changeable between the first form and the second form.

Note that, since "demonstrating a multi-directional characteristic depending on a change of fluidic force," the "fluidic force," the "first form which is capable of suppressing a flow separation by means of a vortex generation," the "second form which is capable of suppressing a turbulent flow" and "being capable of suppressing a turbulent flow" are the same as those definitions on the above-described smart vortex generator, which demonstrates a multi-directional characteristic depending on a temperature change of fluid, their descriptions are omitted herein by making reference to their explanations.

In this smart vortex generator, by means of the arrangement that at least a part of the main body comprises a super-elastic alloy; and that the super-elastic alloy undergoes a super-elastic deformation depending on an increment/decrement of fluidic force acting onto the main body from a predetermined direction without being accompanied by any phase transformation, a form of said main body changes between a first form, which is capable of suppressing a flow separation by means of a vortex generation, and a second form, which is capable of suppressing a turbulent flow.

Thus, in this smart vortex generator, the multi-directional characteristic of the smart vortex generator is demonstrated using the change of the fluidic force of fluid, which is present around the main body, as a controlling input. Namely, similarly to the above-described smart vortex generator which demonstrates a multi-directional characteristic depending on a temperature change of fluid, since this smart vortex generator, too, has turned into a so-called smart structure that detects environments, in which it is put, by itself; judges by itself; and changes to optimum shapes by itself, it is not necessary to supply energy from the outside in order to cause the super-elastic deformation of the super-elastic alloy, and accordingly an electric apparatus as energy-supplying means, and driving means for vortex generator become unnecessary.

Moreover, in this smart vortex generator which demonstrates a multi-directional characteristic depending on a change of fluidic force, since said auxiliary force used as said bias force is not essential, it is not necessary to dispose said auxiliary-force giving means separately, and thereby it contributes more to simplifying the structure and making it maintenance free because of the reduction of constituent component parts.

Note that, in the smart vortex generator which demonstrates a multi-directional characteristic depending on a change of said fluidic force and in which a super-elastic alloy is used, too, it is advisable to dispose supplementary-force (elastic forces, forces which are given by weights and the like, and fluidic pressures, such as pneumatic pressures and water pressures) giving means, which is placed in a predetermined relationship with respect to the main body, depending on need.

In a preferable aspect of the smart vortex generator according to the present invention, said main body has: a base portion being fixed onto said body surface; and a vortex generating portion rising in a predetermined rise posture with respect to the base portion to demonstrate a flow-separation suppressing function when the main body is put into said first form, and additionally turning into a predetermined inclined posture with respect to the base portion to demonstrate a turbulent-flow suppressing function when the main body is put into said second form.

In this smart vortex generator, the vortex generating portion rises in a predetermined rise posture with respect to the base portion and thereby the main body turns into the first form to demonstrate a flow-separation suppressing function; and moreover the vortex generating portion turns into a predetermined inclined posture with respect to the base portion and thereby the main body turns into the second form to demonstrate a turbulent-flow suppressing function. Accordingly, it is possible to securely maintain the form of the main body to the first form and to the second form by means of setting the rise posture and the inclined posture appropriately.

In a preferable aspect of the smart vortex generator according to the present invention, said main body comprises a plate-shaped body in which said base portion and said vortex generating portion, which rises at a predetermined rise angle with respect to the base portion by means of curving or bending from an end periphery of the base portion, are formed integrally; and at least a curved portion or a bent portion, the boundary portion between the base portion and the vortex generating portion, comprises said shape memory alloy or said super-elastic alloy.

Since the main body in this smart vortex generator comprises a plate-shaped body in which the base portion and the vortex generating portion are formed integrally, not only its production is easy but also it becomes lightweight, and it becomes advantageous in view of improving the durability of the main body. Moreover, in the case of employing the shape memory alloy or the super-elastic alloy for the boundary between the base portion and the vortex generating portion (or a curved portion or a bent portion) alone, it is possible to intend weight saving by making the main body's other parts from synthetic resin.

In a preferable aspect, the smart vortex generator according to the present invention is such that said shape memory alloy exhibits a one-way shape memory effect; and said shape memory alloy is subjected to a shape-memorizing treatment so that said vortex generating portion rises at a predetermined rise angle with respect to said base portion by means of curving or bending from the base portion.

Here, the main body when the shape memory alloy is put into said shape-memorized configuration, and the main body, which is put into said first form, are such that their postures and configurations can be identical to each other, or can be different from each other.

In this smart vortex generator, since the shape memory alloy, which exhibits a one-way shape memory effect, is subjected to a shape-memorizing treatment so that the vortex generating portion rises at a predetermined angle with respect to the base portion, the vortex generating portion rises at a predetermined angle with respect to the base portion when the shape memory alloy is put into a high-temperature-side stable phase or a low-load-side stable phase.

In a preferable aspect, the smart vortex generator according to the present invention is such that said shape memory alloy exhibits a one-way shape memory effect; and said shape memory alloy is subjected to a shape-memorizing treatment so that said vortex generating portion turns into a predetermined inclined posture in which it inclines in a direction of lessening the rise angle with respect to said base portion.

Here, the main body when the shape memory alloy is put into said shape-memorized configuration, and the main body, which is put into said second form, are such that their postures and configurations can be identical to each other, or can be different from each other.

In this smart vortex generator, since the shape memory alloy, which exhibits a one-way shape memory effect, is subjected to a shape-memorizing treatment so that the vortex generating portion turns into a predetermined inclined posture with respect to the base portion, the vortex generating portion turns into an inclined posture with respect to the base portion when the shape memory alloy is put into a high-temperature-side stable phase or a low-load-side stable phase.

In a preferable aspect, the smart vortex generator according to the present invention is such that said shape memory alloy exhibits a multi-directional shape memory effect; said shape memory alloy is subjected to a shape-memorizing treatment so that said vortex generating portion rises at a predetermined rise angle with respect to said base portion by means of curving or bending from the base portion, and the shape memory alloy is subjected to a shape-memorizing treatment so that the vortex generating portion turns into a predetermined inclined posture in which it inclines in a direction of lessening the rise angle.

Here, the main body when the shape memory alloy is put into the shape-memorized configuration so that the vortex generating portion rises at a predetermined rise angle with respect to the base portion, and the main body, which is put into said first form, are such that their postures and configurations can be identical to each other, or can be different from each other. Moreover, the main body when the shape memory alloy is put into the shape-memorized configuration so that the vortex generating portion turns into a predetermined inclined posture in which it inclines in a direction of lessening said rise angle, and the main body, which is put into said second form, are such that their postures and configurations can be identical to each other, or can be different from each other.

In this smart vortex generator, since the shape memory alloy, which exhibits a multi-directional shape memory effect, is subjected to a shape-memorizing treatment so that the vortex generating portion rises at a predetermined rise angle with respect to the base portion; and so that the vortex generating portion turns into a predetermined inclined posture, respectively, for example, the vortex generating portion rises at a predetermined rise angle with respect to the base portion when the shape memory alloy is put into a high-temperature-side stable phase or a low-load-side stable phase; and the vortex generating portion turns into a predetermined inclined posture when the shape memory alloy is put into a low-temperature-side stable phase or a high-load-side stable phase.

In a preferable aspect of the smart vortex generator according to the present invention, said object surface is a wing surface of aircraft; and said main body maintains said first form during at least a part of the aircraft's takeoff and landing, and maintains said second body during the aircraft's cruising.

Specifically, the smart vortex generator according to the present invention can be used appropriately for aircraft. An aircraft set forth in claim 20, aircraft which is equipped with the smart vortex generator according to the present invention, is an aircraft in which the smart vortex generator set forth in either one of claims 1 through 19 is disposed on a wing surface thereof, and is characterized in that said main body is configured so that it maintains said first form during at least a part of takeoff and landing; and so that it maintains said second form during cruising.

Here, "at least a part of takeoff and landing of aircraft" means at least a part while an aircraft is taking off (or while the aircraft's altitude and/or airspeed is increasing), or at least a part while an aircraft is landing (or while the aircraft's altitude and/or airspeed is decreasing).

In this smart vortex generator which is disposed on a wing surface of aircraft, the main body maintains said first form to demonstrate a flow-separation suppressing function during at least a part of the aircraft's takeoff and landing, and the main body maintains said second body to demonstrate a turbulent-flow suppressing function during the aircraft's cruising. Accordingly, it is possible to inhibit flows from separating from the wing surface upon the aircraft's takeoff and landing, and thereby it becomes feasible to intend the suppression of stall and the improvement of unstable phenomena. Moreover, upon the aircraft's cruising, since it can decrease the generation of vortexes or can cause the generation of vortexes to disappear to suppress turbulent flows that result from vortexes, it becomes feasible to control drag augmentation that results from turbulent flows.

In a preferable aspect of the smart vortex generator according to the present invention, said object surface is a hull surface of vessel (or a hull surface in a submerged section of hull), or on a surface of a wing installed to a hull.

Specifically, the smart vortex generator according to the present invention can be used appropriately for vessel. A vessel set forth in claim 21, vessel which is equipped with the smart vortex generator according to the present invention, is one which is characterized in that the smart vortex generator set forth in either one of claims 1 through 19 is disposed on a hull surface thereof, or on a surface of a wing being installed to a hull thereof.

In this smart vortex generator which is disposed on a hull surface of vessel or on a surface of a wing being installed to a hull thereof, it turns into an austenitic phase, the high-temperature-side stable phase or the low-load-side stable phase, for instance, within a temperature range where a temperature of fluid becomes a high-temperature-side assumed temperature or more or within a load range where a fluidic force of fluid becomes a low-load-side assumed load or less, that is, a part during the vessel's navigation, so that the form of the main body turns into the first form (or the second form); and it turns into a martensitic phase (or a stress-induced martensitic phase), the low-temperature-side stable phase or the high-load-side stable phase, for instance, within a temperature range where a temperature of fluid becomes a low-temperature-side assumed temperature or less or within a load range where a fluidic force of fluid becomes a high-load-side assumed load or more, that is, another part during the vessel's navigation, so that the form of the main body turns into the second form (or the first form). Accordingly, it demonstrates a separation suppressing function (or a turbulent-flow suppressing function) in said part during the navigation so that it is possible to inhibit flows from separating from the hull surface or the wing surface (or it decreases the generation of vortexes or causes the generation of vortexes to disappear and thereby it is possible to inhibit turbulent flows resulting from vortexes); and it moreover demonstrates a turbulent-flow suppressing function (or a separation suppressing function) in said another part during the navigation so that it decreases the generation of vortexes or causes it to disappear and thereby it is possible to inhibit turbulent flows resulting from vortexes (or it is possible to inhibit flows from separating therefrom).

In a preferable aspect of the smart vortex generator according to the present invention, said object surface is a wing surface of rotary machine.

Specifically, the smart vortex generator according to the present invention can be used appropriately for rotary machine. A rotary machine set forth in claim 22, rotary machine which is equipped with the smart vortex generator according to the present invention, is one which is characterized in that the smart vortex generator set forth in either one of claims 1 through 19 is disposed on a wing surface thereof.

Here, in the "rotary machine," turbines, compressors, pumps such as turbo pumps, air blowers, and the like, are included; and, in the "wing" of this rotary machine, turbine vanes (or blades), rotor wings, impeller blades, and so forth, are included.

In this smart vortex generator which is disposed on a wing surface of rotary machine, it turns into an austenitic phase, the high-temperature-side stable phase or the low-load-side stable phase, for instance, within a temperature range where a temperature of fluid becomes a high-temperature-side assumed temperature or more or within a load range where a fluidic force of fluid becomes a low-load-side assumed load or less, that is, a part during the rotary machine's operation, so that the form of the main body turns into the first form (or the second form); and it turns into a martensitic phase (or a stress-induced martensitic phase), the low-temperature-side stable phase or the high-load-side stable phase, for instance, within a temperature range where a temperature of fluid becomes a low-temperature-side assumed temperature or less or within a load range where a fluidic force of fluid becomes a high-load-side assumed load or more, that is, another part during the rotary machine's operation, so that the form of the main body turns into the second form (or the first form).

Accordingly, it demonstrates a separation suppressing function (or a turbulent-flow suppressing function) in said part during the operation so that it is possible to inhibit flows from separating from the wing surface (or it decreases the generation of vortexes or causes the generation of vortexes to disappear and thereby it is possible to inhibit turbulent flows resulting from vortexes); and it moreover demonstrates a turbulent-flow suppressing function (or a separation suppressing function) in said another part during the operation so that it decreases the generation of vortexes or causes it to disappear and thereby it is possible to inhibit turbulent flows resulting from vortexes (or it is possible to inhibit flows from separating therefrom). Therefore, it can be utilized suitably for such a rotary machine in which a temperature change arises during its running; the property of working fluid (or the viscosity, and the like) changes greatly because of the resulting temperature change; and, as a result of this, flows have separated from its impeller blades, and so forth, for instance.

BRIEF DESCRIPTION OF THE DRAWINGS

FIG. 7(a) is a diagram for explaining an appearance how the separation of flows from a wing surface is suppressed in the wing surface on which vortex generators are disposed; and FIG. 7(b) is a diagram for explaining an appearance how flows separate from a wing surface on which no vortex generator is disposed.

FIG. 14(a) is a diagram for explaining an appearance how the separation of flows from a hull surface is suppressed in the hull surface on which vortex generators are disposed; and FIG. 14(b) is a diagram for explaining an appearance how flows separate from a hull surface on which no vortex generator is disposed.

FIG. 16(a) is a diagram for explaining an appearance how the separation of flows from an impeller-blade surface is suppressed in the impeller-blade surface on which a vortex generator is disposed; and FIG. 16(b) is a diagram for explaining an appearance how flows separate from an impeller-blade surface on which no vortex generator is disposed.

BEST MODE FOR CARRYING OUT THE INVENTION

Hereinafter, embodiment modes according to the present invention will be explained specifically with reference to the drawings.

First Embodiment Mode

This First Embodiment Mode is one which relates to a smart vortex generator which demonstrates a bidirectional characteristic depending on a temperature change of fluid.

Embodiment Mode 1

This Embodiment Mode 1 is one which relates to a smart vortex generator which demonstrates a bidirectional characteristic by means of a combination of a shape memory alloy's one-way shape memory effect and a bias force, which comprises a spring force and a fluidic force. Moreover, this embodiment mode is one in which the smart vortex generator according to the present invention is applied to an airplane, one of aircraft; more concretely, to an airplane (or a jet plane, for instance) which flies at high altitude.

Figure 1:
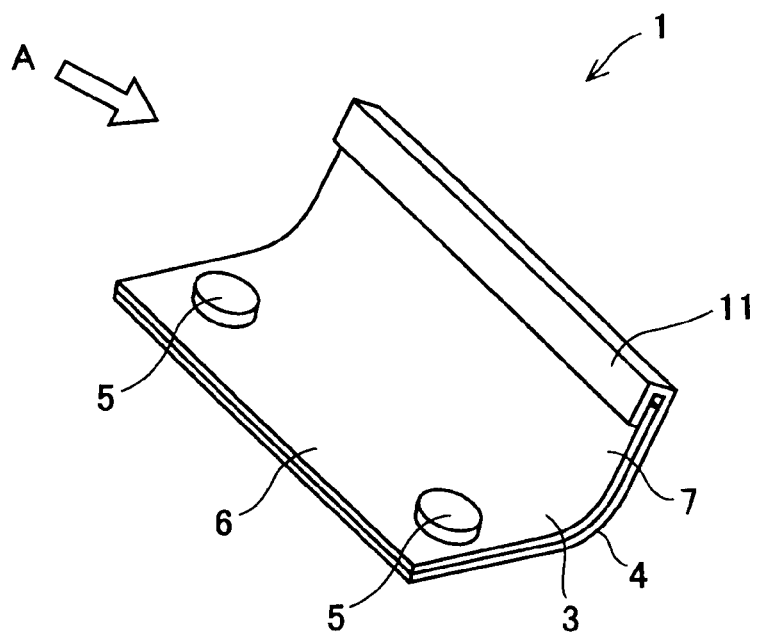
FIG. 1 is directed to Embodiment Mode 1, and is a perspective view of a smart vortex generator whose main body is put into a first form.
Figure 2:
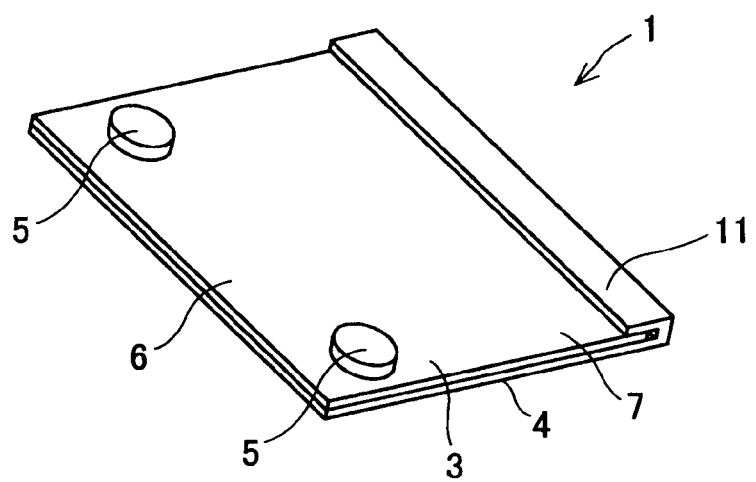
FIG. 2 is directed to Embodiment Mode 1, and is a perspective view of the smart vortex generator whose main body is put into a second form.
Figure 3:
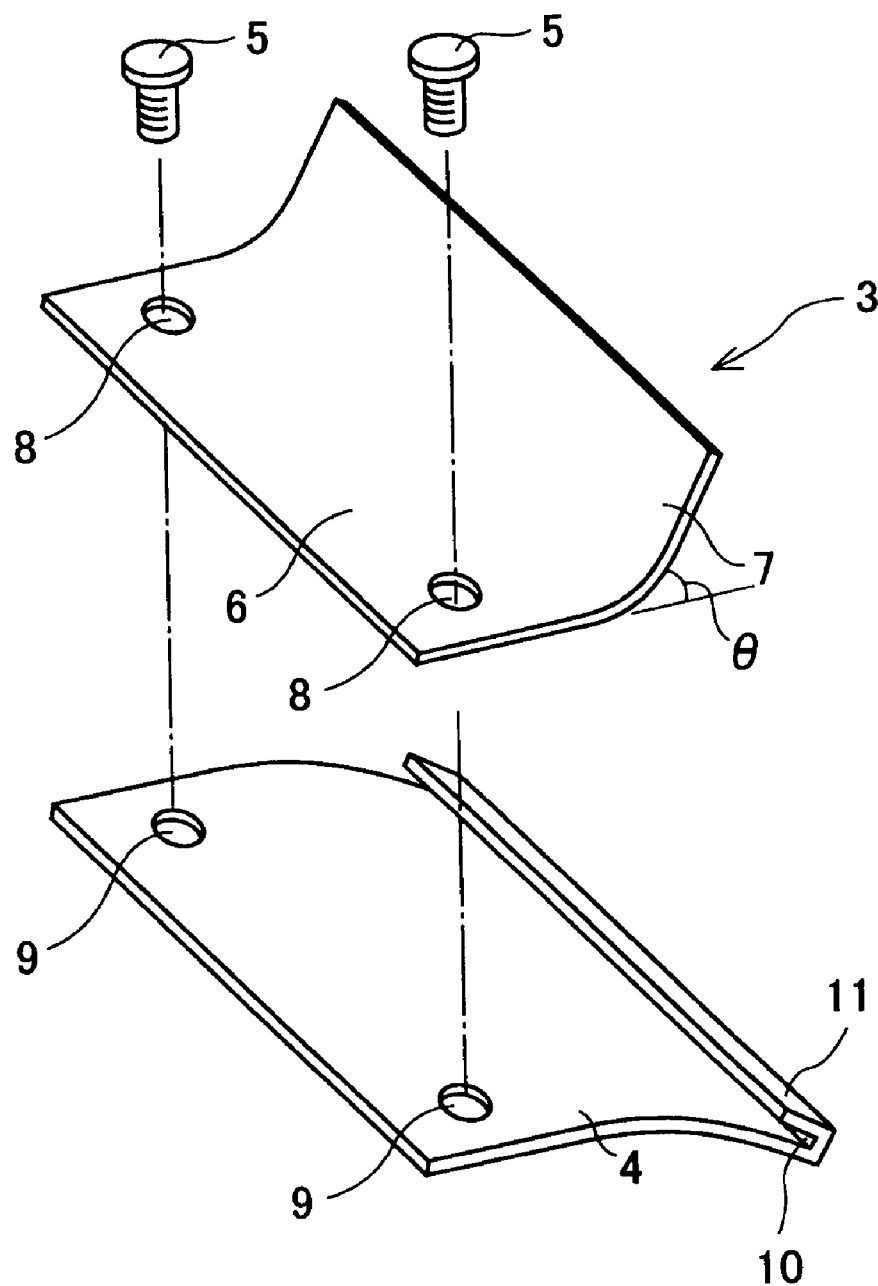
FIG. 3 is directed to Embodiment Mode 1, and is an exploded perspective view for illustrating the assemblage of the smart vortex generator.
Figure 4:
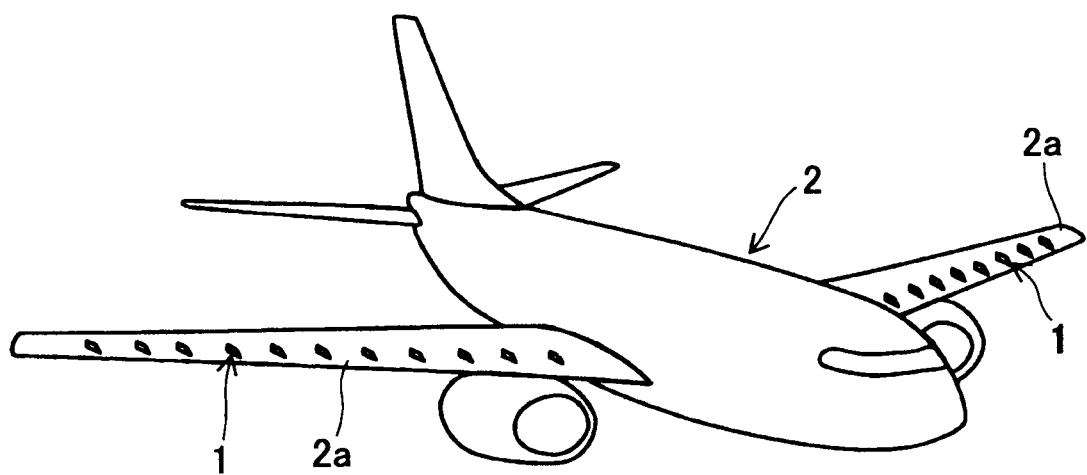
FIG. 4 is directed to Embodiment Mode 1, and is a perspective view for schematically illustrating an airplane in which the smart vortex generators are placed on the main wing.
Figure 5:
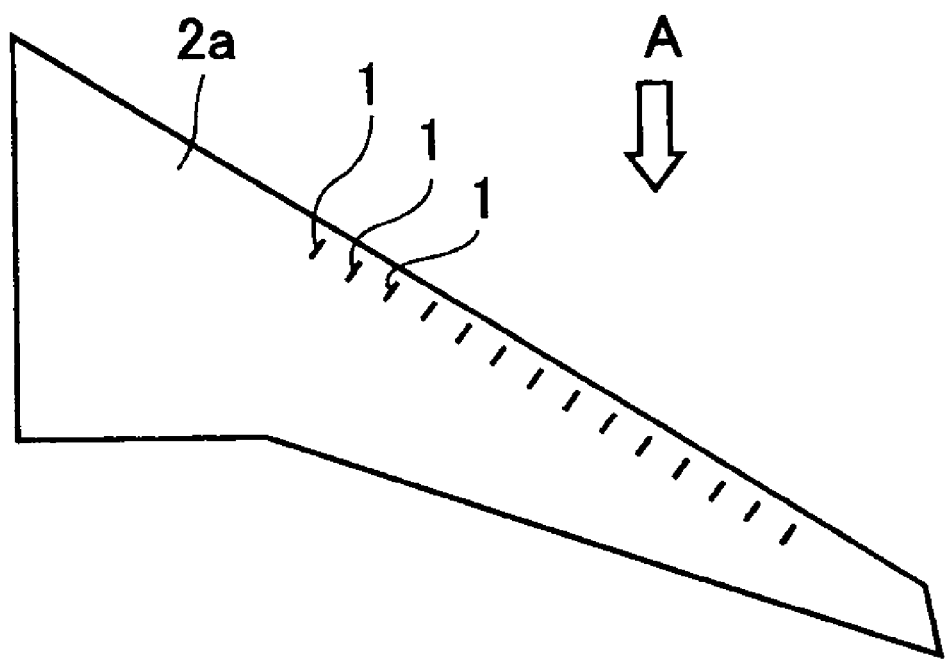
FIG. 5 is directed to Embodiment Mode 1, and is a plan view for schematically illustrating such a state that the smart vortex generators are placed on an aircraft's main wing.

A smart vortex generator 1 according to the present embodiment mode illustrated in FIG. 1 through FIG. 3 is one which is placed on an aircraft's wing surface, and thereby it is put in service; more concretely, as illustrated in FIG. 4 and FIG. 5, it is placed on a top-surface leading-edge side of an airplane 2's main wing 2a, which possesses a control surface, in a plurality of pieces at intervals in a lateral direction (or in the main wing 2a's longitudinal direction), and thereby it is put in service. This smart vortex generator 1 suppresses the flow separation, which occurs on the main wing 2a's surface making the boundary to a flow of fluid; and moreover demonstrates a bidirectional characteristic depending on a temperature change of fluid. Note that the placement number of the smart vortex generators 1 is not limited in particular, and is set properly within a range of from a couple of pieces to dozens of pieces approximately. Moreover, the placement locations of the smart vortex generators 1 are not limited in particular, either, and can be in the middle of the main wing 2a approximately as far as they are placed forward on control surface and are placed on a more forward side than the part at which flows separate. Moreover, the respective smart vortex generators 1 are placed so that a flow of fluid upon flying runs into a plate surface (a front-side face, a bent concave side or curved concave side (described later) of a main body) of a vortex generating portion, which is put into a first form shown in FIG. 1; that is, the vortex generating portion's plate surface faces obliquely with respect to the flow direction (or the arrowheaded direction A in FIG. 1 and FIG. 5).

Specifically, this airplane 2 is equipped with the smart vortex generators 1 which are disposed on the main wing 2a's surface making a boundary to a flow of fluid, which suppress the flow separation occurring on the main wing 2a's surface, and which demonstrate a multi-directional characteristic depending on a temperature change of fluid.

The smart vortex generators 1 are equipped with a main body 3, which comprises a shape memory alloy exhibiting a one-way shape memory effect, and a blade spring (or an elastic body) 4, auxiliary-force giving means, which is placed in a predetermined relationship with respect to the main body 3 and thereby gives a spring force (or an elastic force), a predetermined auxiliary force, onto the main body 3.

As illustrated in FIG. 3, the main body 3 is one which is formed integrally by means of bending a plate-shaped, such as rectangle-shaped, body (or a flat plate) comprising a shape memory alloy. The main body 3 comprises a substantially-flat-plate-shaped base portion 6, which is fixed onto the main wing 2a's top surface by means of bolts 5, 5, and a substantially-flat-plate-shaped vortex generating portion 7, which bends (or curves) from a side-end edge of this base portion 6 when the main body 3 is put into a later-described first form (see FIG. 1) and thereby rises in a predetermined rise posture to demonstrate a flow-separation suppressing function. Note that, in the base portion 6, two bolt-insertion through holes 8, 8 are penetrated therethrough.

Specifically, the main body 3 is formed by means of subjecting said shape memory alloy to a shape-memorizing treatment on a higher-temperature side, that is, an austenitic transformation finish temperature (or a reverse transformation finish temperature) or more of said shape memory alloy upon no load application, so that the vortex generating portion 7 bends from the base portion 6 to rise at a predetermined rise angle (or an elevation angle of the vortex generating portion 7, which rises but inclines with respect to a horizontal plane involving the base portion 6, (or an angle that the horizontal plane and the vortex generating portion 7 make), that is, an angle θ shown in FIG. 3). Accordingly, this main body 3 is such that, when a temperature is an austenitic transformation finish temperature or more of said shape memory alloy upon no load application, the shape memory alloy turns into an austenitic phase, a high-temperature-side stable phase, so that the vortex generating portion 7 rises at said predetermined angle θ with respect to the base portion 6 in such a natural state that no load is applied to it from the outside.

Note that the main body 3 (see FIG. 3) when said shape memory alloy is put into a configuration being shape-memorized and the main body 3 (see FIG. 1) which is put into a later-described first form are such that their rise angles differ. Namely, the main body 3, which is put into a first form, is such that the rise angle is smaller than that of the main body 3, which is put into a shape-memorized configuration, by means of the blade spring 4's spring force and a fluidic force of fluid, which acts onto the main body 3 from the arrowheaded direction A in FIG. 1.

In the service conditions of the smart vortex generator 1 according to the present embodiment mode, the shape memory alloy, which constitutes the main body 3, is one which turns into an austenitic phase in at least a part during the airplane 2's takeoff and landing; and which turns into a martensitic phase (or a stress-induced martensitic phase) during the airplane 2's cruising. Namely, this shape memory alloy is such that the alloy composition (or components or combining ratios) or heat treatment conditions, and the like, are adjusted so that an assumed air temperature at low altitude upon the airplane 2's takeoff and landing (or a specific value of high-temperature-side assumed temperatures) is an austenitic transformation finish temperature or more of the shape memory alloy in such a state that it receives an external load, which acts onto the shape memory alloy during flying; and so that an assumed air temperature at high altitude upon the airplane 2's cruising (or cruising altitude) (or a specific value of low-temperature-side assumed temperatures) is a martensitic transformation finish temperature or less of the shape memory alloy in such a state that it receives said external load.

Specifically, the smart vortex generator 1 according to the present embodiment mode is configured so that, when a temperature of said fluid reaches a transformation start temperature of said shape memory alloy in such a state that it receives an external load, which acts onto said shape memory alloy during flying, in a temperature decrement process, said shape memory alloy starts transforming from an austenitic phase to a martensitic phase; and so that, when the temperature of said fluid reaches a reverse transformation start temperature of said shape memory alloy in such a state that it receives said external load in a temperature increment process, said shape memory alloy starts transforming reversely from a martensitic phase to an austenitic phase.

Here, in the present embodiment mode, the blade spring 4's spring force, and the fluidic force of fluid around the main body 3 during flying become said external load acting onto the shape memory alloy in service. Moreover, the blade spring 4's spring force, and the fluidic force of fluid, which acts onto the main body 3 from the arrowheaded direction A in FIG. 1 during flying become the bias force required for letting the shape memory alloy, which exhibits a one-way shape memory effect, demonstrate a multi-directional characteristic.

Moreover, when applying it to aircraft, the high-temperature-side assumed temperature can be set to a predetermined value within a range of from −30 to 40° C. approximately; and the low-temperature-side assumed temperature can be set to a predetermined value within a range of from −60 to −40° C. approximately. Moreover, the transformation temperatures of the shape memory alloy, which constitutes the main body 3, upon no load application are such that it is possible to adapt the martensitic transformation temperature to from −45 to −35° C. approximately; and it is possible to adapt the austenitic transformation temperature to from −35 to −25° C. approximately, for instance.

Moreover, the present inventor confirmed that, at all times during flying, the delay of the follow-up time of the shape memory alloy's temperature with respect to the fluidic temperature is less than 1 second, that is, the shape memory alloy's temperature follows up the fluidic temperature during flying extremely well and the two coincide with each other virtually perfectly.

As for the shape memory alloy constituting the main body 3, it is possible to employ those such as Ni—Ti systems to which Cu, Fe or Co, and the like, is added in order to adjust the transformation temperatures, or Cu—Zn—Al systems, and so forth, for instance.

As illustrated in FIG. 3, the blade spring 4 comprises a substantially-rectangle-shaped metallic thin plate, which exhibits a predetermined spring force, and has a bow-shaped horizontal-cross-sectional configuration, which curves so as to warp in such a natural state that no load is applied thereto from the outside. Since this blade spring 4 is installed to the main body 3 so that the convex curved surface, which is curved in a bow shape, faces the main body 3's rear-surface side (or the main body 3's flexed convex side or curved convex side), a spring force remains in the blade spring 4 even when the main body 3 is put into a later-described second form (see FIG. 2). Adjacent to one of the opposite side ends of the blade spring 4's opposite longer sides, two bolt-insertion through holes 9, 9 are penetrated therethrough. Moreover, at the other one of the opposite side ends of the blade spring 4's opposite longer sides, a clip portion 11 with a cross-sectionally letter-"L" shape, which forms a groove portion 10 into which the leading end of the main body 3's vortex generating portion 7 fits, is disposed by means of bending.

Here, the blade spring 4's spring force is set in the following manner: that is, in the service conditions of the smart vortex generator 1 according to the present embodiment mode, the smart vortex generator 1 can maintain a later-described first form by means of a balance between the shape memory alloy's stress-strain characteristic and said bias force when a temperature of fluid is the high-temperature-side assumed temperature or more upon takeoff and landing; and the smart vortex generator 1 can maintain a later-described second form by means of a dynamic relationship between the shape memory alloy's stress-strain characteristic and said bias force when the temperature of fluid is the low-temperature-side assumed temperature or less upon cruising.

Specifically, in the smart vortex generator 1 according to the present embodiment mode, while taking the assumed temperatures, the fluidic force of fluid, which acts onto the main body 3, and the like, upon takeoff and landing and upon cruising into account as a whole, the spring force of the blade spring 4 and the stress-strain characteristic of the shape memory alloy, which constitutes the main body 3, are set so as to effect as follows. When a temperature of fluid is the high-temperature-side assumed temperature or more, that is, in at least a part when the airplane 2, in which the smart vortex generators 1 are installed on the main wing 2a's top surface, takes off and lands (or in a part of the takeoff and landing process, when the altitude is on a lower side), the main body 3's vortex generating portion 7 turns into an optimum or satisfactory rise posture (or the form of the main body 3 turns into an optimum or satisfactory first form) as shown in FIG. 1, and thereby it is capable of demonstrating an optimum or satisfactory separation suppressing function; and, during the same airplane 2' cruising (or when the temperature of fluid is the low-temperature-side assumed temperature or less), the main body 3's vortex generating portion 7 turns into an optimum inclined posture in such a state that it inclines from the rise posture to lie down so as to be superimposed over along the main wing 2a' surface (or the form of the main body 3 turns into an optimum second form) as shown in FIG. 2, and thereby it is capable of demonstrating an optimum turbulent-flow suppressing function.

Here, the main body 3's first form, in addition to a form which is put into an optimum or satisfactory rise posture in which the vortex generating portion 7 rises at an optimum or satisfactory rise angle, also includes forms, which are put into a plurality of satisfactory rise postures whose rise angles are decreased continuously from that of this optimum or satisfactory rise posture within a certain range. Moreover, the main body 3's second form is the optimum inclined posture in which said rise angle $\theta$ of the vortex generating portion 7 becomes 0 degree substantially, and thereby the vortex generating portion 7 makes a substantially flat plate shape along with the base portion 6 to lie down so as to be superimposed over along the main wing 2a' surface.

The smart vortex generator 1 according to the present embodiment mode is put in service as described below. Into the groove portion 10 of the blade spring 4's clip portion 11, the leading end of the main body 3's vortex generating portion 7 is fitted; and then, while elastically deforming the blade spring 4 along the shape of the main body 3, the main body 3's base portion 6 is fixed onto the main wing 2a's top surface along with the blade spring 4 by means of the bolts 5, 5, which are put through the main body 3's bolt-insertion through holes 8, 8 and through the blade spring 4's bolt-insertion through holes 9, 9.

Note that the installation operation of the smart vortex generators 1 onto the main wing 2a is carried out on the ground, that is, at the austenitic transformation finish temperature or more of said shape memory alloy under no load application. Accordingly, before the installation operation, the main body 3 makes a shape-memorized configuration, and the main body 3's vortex generating portion 7 rises at said predetermined rise angle (see FIG. 3). And, after the installation, the main body 3's vortex generating portion 7 rises in a posture in which said rise angle $\theta$ becomes smaller slightly by means of the blade spring 4's spring force.

The smart vortex generator 1 according to the present embodiment having such a construction demonstrates such a bidirectional characteristic that it automatically operates repetitively in accordance with the rise and fall of the fluidic temperature around the main body 3 by utilizing a one-way shape memory effect of the shape memory alloy, which constitutes the main body 3, and the bias force, which comprises the blade spring 4's spring force and the fluidic force of fluid acting onto the main body 3 from the arrowheaded direction A in FIG. 1, as indicated below.

Here, the following explanations are on such a case that the high-temperature-side assumed temperature is adapted to $-10°$ C., and the low-temperature-side assumed temperature is adapted to $-50°$ C.; moreover, regarding the transformation temperatures of the shape memory alloy which constitutes the main body 3, under no load application, both martensitic transformation start temperature and austenitic transformation start temperature are adapted to $-35°$ C. (namely, a reversible transformation temperature is adapted to $-35°$ C.) Note that the reversible transformation temperature is a transformation temperature in such an ideal case that there is no energy loss inside the shape memory alloy during the transformation.

Figure 6:
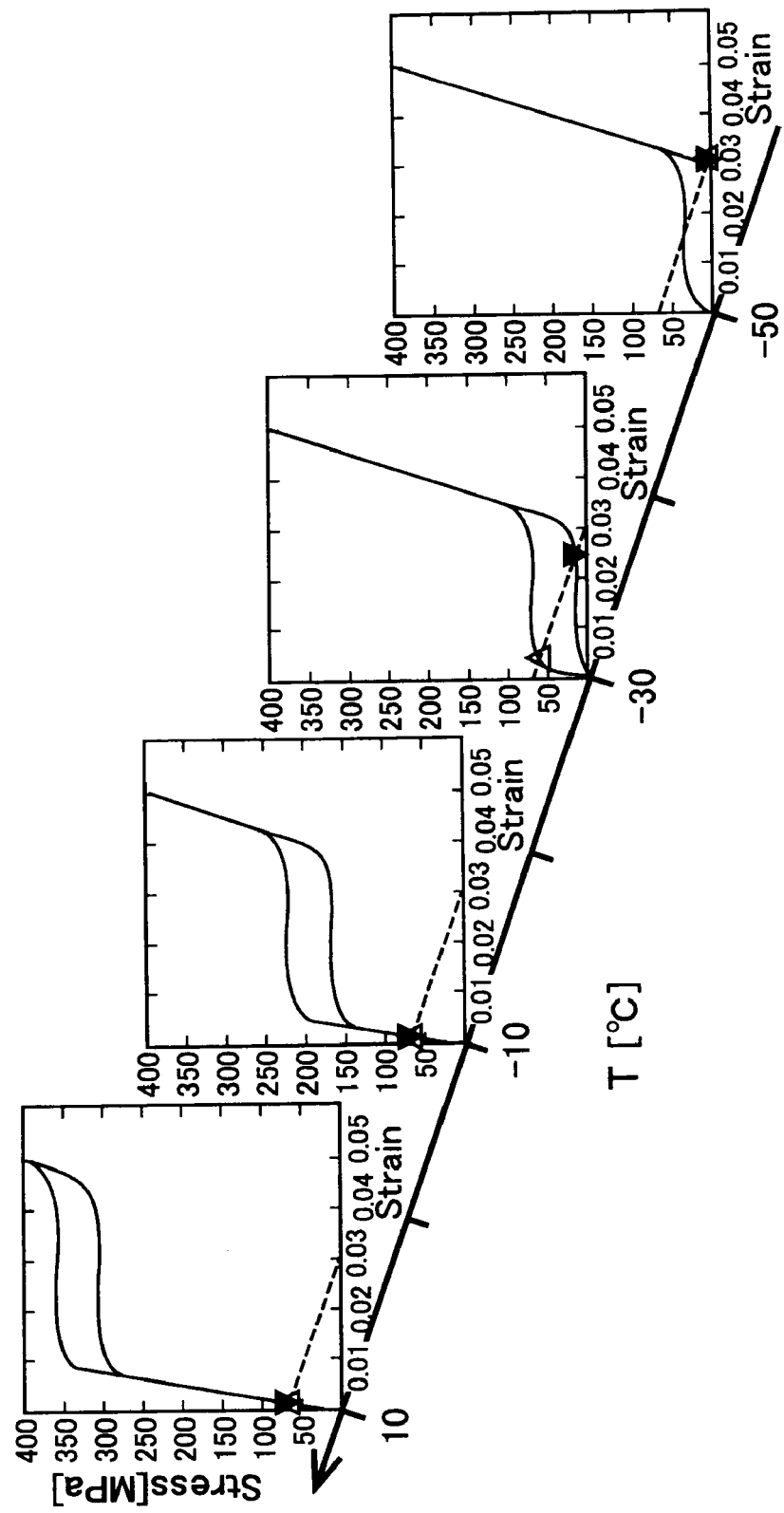
FIG. 6 is directed to Embodiment Mode 1, and is a diagram for illustrating stress-strain characteristics of a shape memory alloy, which constitutes the main body of the smart vortex generator, at the respective temperatures.

During flying, the fluidic temperature changes depending on the airplane 2's altitude, and the stress-strain characteristic of the shape memory alloy, which constitutes the main body 3, also changes depending on this temperature change as shown in FIG. 6. Moreover, during flying, the bias forces designated with the dotted lines in FIG. 6 act onto the shape memory alloy, which constitutes the main body 3. Since things have become complicated when considering a fluidic force of said fluid, the dotted lines in FIG. 6 specify bias forces, which result from the blade spring 4's spring force alone. Accordingly, those where the balance between the shape memory alloy's stress-strain characteristics and the bias forces is established at the respective temperatures shown in FIG. 6 become operational points, and then the main body 3's form changes. Note that the Δ marks in FIG. 6 designate the operational points upon temperature decrement, and the ▼ marks designate the operational points upon temperature increment.

Figure 7:
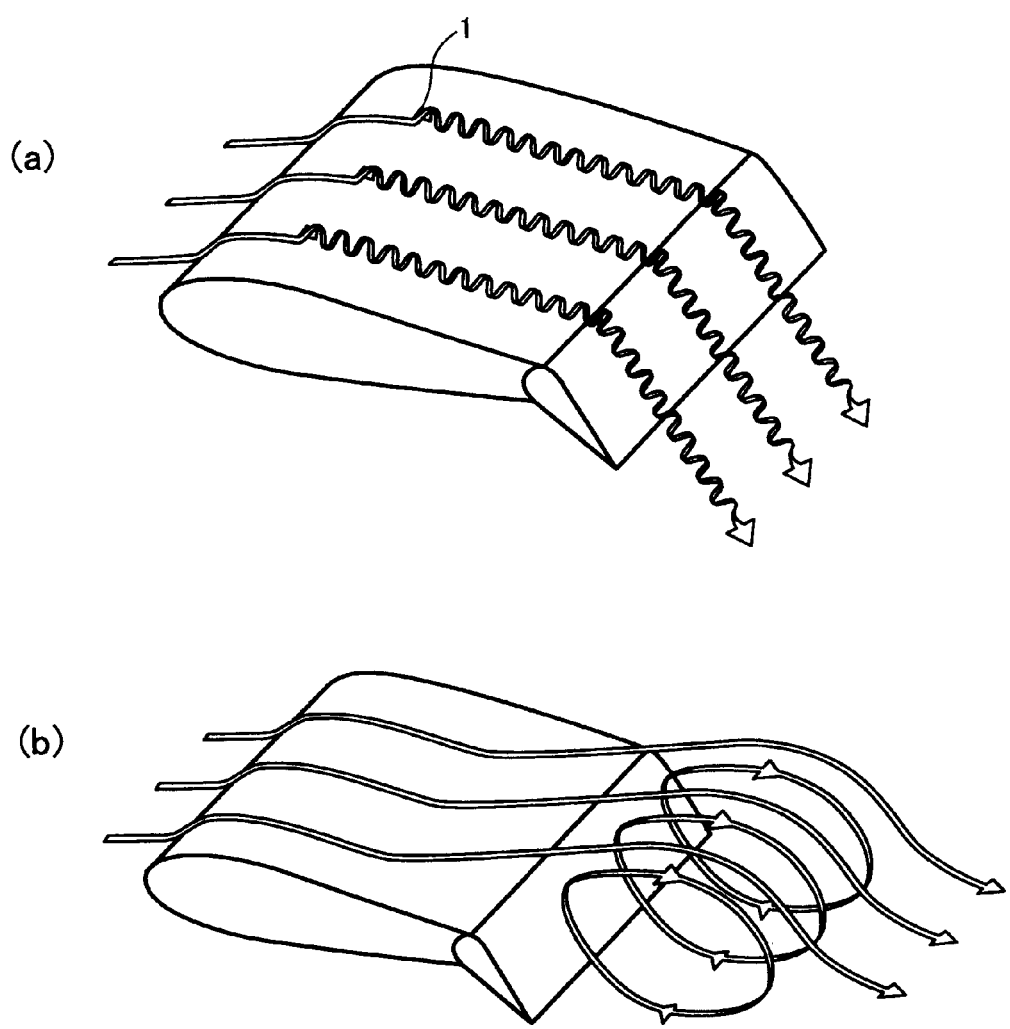
FIG. 7 is one which illustrates flows on an airplane's wing surface schematically.

And, when the airplane 2 in which the smart vortex generators 1 according to the present embodiment mode are placed on the main wing 2a starts taking off, and in the first-half stage of takeoff, the fluidic temperature around the main body 3 is temperatures of the high-temperature-side assumed air temperature (or −10° C.) or more. On this occasion, according to said shape memory alloy's stress-strain characteristics at 10° C. and −10° C., for instance, although the shape memory alloy, which constitutes the main body 3, transforms from an austenitic phase to a stress-induced martensitic phase at a load of about 340 MPa and about 220 MPa, respectively, said bias forces, which are given to this shape memory alloy, are 60 MPa approximately on this occasion (see FIG. 6). Accordingly, when the fluidic temperature is −10° C. or more, the high-temperature-side assumed air temperature, said shape memory alloy, which constitutes the main body 3, undergoes an elastic deformation slightly while remaining in an austenitic phase. Therefore, by means of the balance between the shape memory alloy's stress-strain characteristics and said bias forces, the main body 3's vortex generating portion 7 rises at an optimum/satisfactory rise angle (or 90 degrees approximately), and thereby the main body 3's form is maintained to the first form (or the state in FIG. 1). Thus, the main body 3's vortex generating portion 7 generates vortexes on the main wing 2a's surface, thereby inhibiting flows from separating from the main wing 2a's surface effectively (see FIG. 7(a)). Note that FIG. 7(a) is a diagram for explaining an appearance how the separation of flows from a wing surface is suppressed in the wing surface on which vortex generators are disposed, and that FIG. 7(b) is a diagram for explaining an appearance how flows separate from a wing surface on which no vortex generator is disposed.

And, when this airplane 2 ascends, the fluidic temperature around the main body 3 drops as being accompanied therewith. Then, being accompanied by the temperature decrement of fluid, the shape memory alloy's stress-strain characteristic also changes. For example, when the fluidic temperature is −30° C., it transforms from an austenitic phase to a stress-induced martensitic phase under a load of about 70 MPa; and, when the fluidic temperature is −50° C., it turns into a temperature-induced martensitic phase under no load-application condition and it transforms to a stress-induced martensitic phase under a load of about 30 MPa (see FIG. 6). Moreover, although being not shown in the drawing, when the fluidic temperature is between −30° C. and −50° C., an austenitic phase and a temperature-induced martensitic phase are mixed under no load-application condition, and there are regions which transform to stress-induced martensitic phases under loads lower than 30 MPa. Accordingly, in the second-half stage of takeoff when the fluidic temperature around the main body 3 becomes −30° C. or less, the main body 3's vortex generating portion 7 inclines greatly by means of the balance between the shape memory alloy's stress-strain characteristics and said bias forces. Note that, in this second-half stage of takeoff, since main body's vortex generating portion 7 does not turn into the laid state (or the main body 3's second form) completely, it demonstrates a separation suppressing function more or less by means of the generation of vortex.

And, when this airplane 2 further ascends to reach an altitude upon cruising, the fluidic temperature around the main body 3 becomes the low-temperature-side assumed air temperature (or −50° C.) or less. Then, as a result that the shape memory alloy, which constitutes the main body 3, is cooled in such a state that the bias forces are given thereto (or in a state of receiving said external load) in that temperature decrement process, it transforms from an austenitic phase to a stress-induced martensitic phase. Therefore, by means of the balance between the shape memory alloy's stress-strain characteristic and said bias force, the main body 3's vortex generating portion 7 turns into the optimum inclined posture in such a state that it lies down completely so as to be superimposed over along the main wing 2a' surface, and thereby the main body 3's form is maintained to the second form (or the state in FIG. 2). Thus, the generation of vortex from the main body 3's vortex generating portion 7 disappears, thereby suppressing turbulent flows, which result from the generation of vortex, effectively.

Thereafter, when this airplane 2 lands, since the fluidic temperature around the main body 3 rises as being accompanied by the descent of the altitude, the main body 3's vortex generating portion 7 gets up from the laid state by means of the balance between the shape memory alloy's stress-strain characteristic and said bias force. And, when the fluidic temperature around the main body 3 becomes the high-temperature-side assumed air temperature or more in the second-half stage of landing, the main body 3 turns into said first form again, thereby inhibiting flows from separating effectively.

Thus, in this smart vortex generator 1, the main body 3 maintains the first form to demonstrate a flow-separation suppressing function when the fluidic temperature around the main body 3 is on a higher temperature side, the austenitic transformation finish temperature or more of the shape memory alloy in such a state that it receives said external load; and the main body 3 maintains the second form to demonstrate a turbulent-flow suppressing function when the fluidic temperature is on a lower temperature side, the martensitic transformation finish temperature or less of the shape memory alloy in such a state that it receives said external load.

In this way, in the smart vortex generator 1 according to the present embodiment mode, the form of the main body 3 changes between the first form, which suppresses flow separations by means of the generation of vortex, and the second form, which suppresses turbulent flows, by way of the phenomenon that the shape memory alloy, which constitutes the main body 3, undergoes a phase transformation between an austenitic phase and a martensitic phase depending on the temperature change of the fluid around the main body 3.

Thus, in the smart vortex generator 1 according to the present embodiment mode, the bidirectional characteristic of the smart vortex generator 1 is demonstrated using the temperature change of fluid, which is present around the main body 3, as a controlling input. Namely, this smart vortex generator 1 has turned into a so-called smart structure that detects environments, in which it is put, by itself; judges by itself; and changes to optimum shapes by itself. Moreover, it is not necessary to supply energy from the outside in order to cause the phase transformation of the shape memory alloy, and accordingly an electric apparatus as energy-supplying means, and driving means for vortex generator become unnecessary. Therefore, the smart vortex generator 1 according to the present embodiment mode is such that the structure is simple; failures are less likely to occur; and the repairs and maintenance as well as the installation to existing wings become easier.

Moreover, since the smart vortex generator 1 according to the present embodiment mode can lower the drag upon cruising, it contributes greatly to improving the fuel consumption of the airplane 2.

Further, in this smart vortex generator 1 according to the present embodiment mode, since the blade spring 4 is employed as auxiliary-force giving means, it is possible to easily adjust the spring force as an auxiliary force by appropriately setting the shape, size, thickness and material of the blade plate 4, and additionally it contributes more to simplifying the structure and making it maintenance free.

In addition, since the main body 3 in this smart vortex generator 1 comprises a plate-shaped body in which the base portion 6 and the vortex generating portion 7 are formed integrally, its manufacture is easy, and additionally it becomes lightweight, and it is advantageous in view of improving the durability of the main body 3.

Note that, in this embodiment mode, although an aspect is explained, aspect in which the main body 3 maintains the first form in the first-half stage during takeoff and in the second-half stage during landing, it is advisable as well that the main body 3 can be configured so as to always maintain the first form during takeoff and landing by means of appropriately setting the stress-strain characteristic of the shape memory alloy, which constitutes the main body 3, and the spring force of the blade spring 4, and the like.

Moreover, in this embodiment mode, although an example is explained, example in which said rise angle of the vortex generating portion 7 is adapted to being 90 degrees substantially when the main body 3 is put into the first form, this rise angle is not limited thereto, and it is feasible to set it suitably within such a range that it is capable of demonstrating a desirable separation suppressing function. Likewise, said rise angle of the vortex generating portion 7 when the main body 3 is put into the second form is not limited to being 0 degree substantially, and it is feasible to set it suitably within such a range that it is capable of demonstrating a desirable turbulent-flow suppressing function.

Embodiment Mode 2

Figure 8:
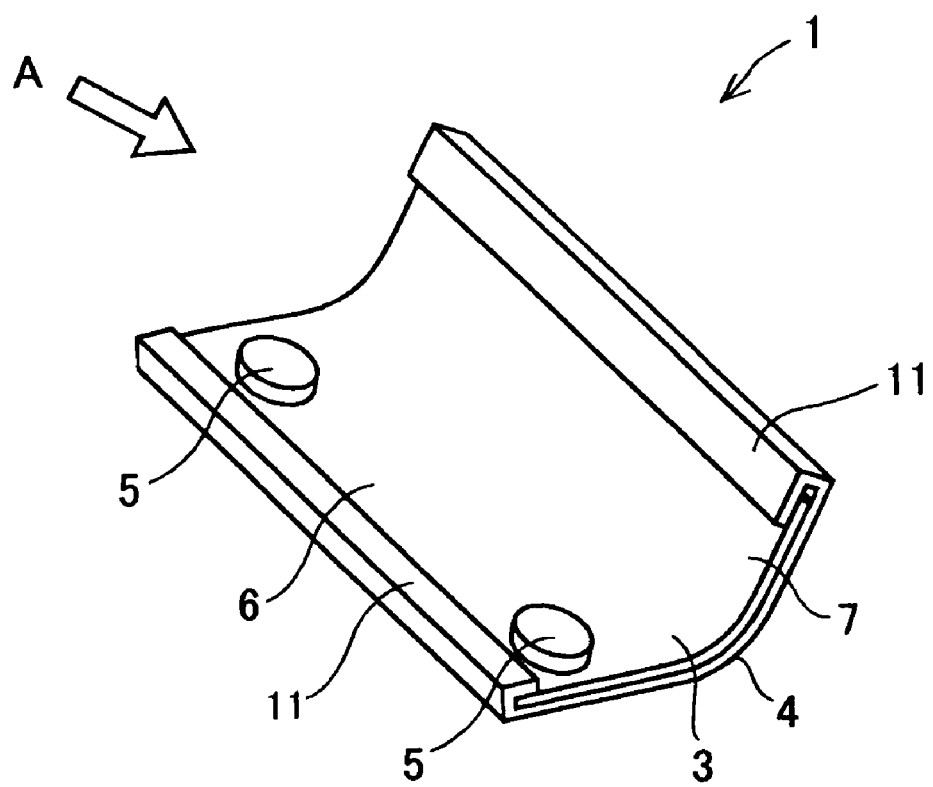
FIG. 8 is directed to Embodiment Mode 2, and is a perspective view of a smart vortex generator whose main body is put into a first form.

In the same manner as said Embodiment Mode 1, the present embodiment mode shown in FIG. 8 is one which relates to a smart vortex generator demonstrating a bidirectional characteristic by means of a combination of a shape memory alloy's one-way shape memory effect and a bias force comprising a spring force and a fluidic force, and is one in which the blade spring 4's shape is modified in said Embodiment Mode 1.

Specifically, the blade spring 4 in this embodiment mode is such that, at one of the opposite side ends of the longer side, a clip portion 11 with a cross-sectionally letter-"L" shape, which forms a groove portion into which the leading end of the main body 3's vortex generating portion 7 fits, is formed by means of bending; and additionally is such that, at the other one of the opposite side ends of the longer side, a clip portion 11 with a cross-sectionally letter-"L" shape, which forms a groove portion into which the leading end of the main body 3's base portion 6 fits, is formed by means of bending.

In accordance with this blade spring 4, it is possible to fit the main body 3's opposite ends, namely, both base portion 6's end and vortex generating portion 7's end, into the blade spring 4's clip portions 11. Therefore, the placement of the smart vortex generator 1 becomes much easier.

Since the other constructions and operations/effects are the same as those of said Embodiment Mode 1, their descriptions are omitted herein by making reference to their explanations on said Embodiment Mode 1.

Embodiment Mode 3

Figure 9:
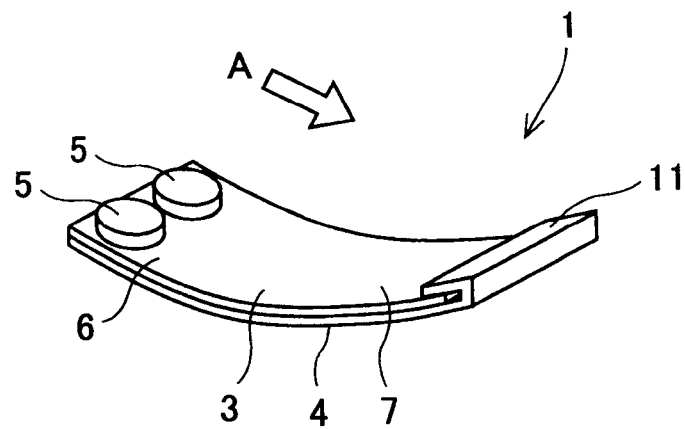
FIG. 9 is directed to Embodiment Mode 3, and is a perspective view of a smart vortex generator whose main body is put into a first form.

In the same manner as said Embodiment Mode 1, the present embodiment mode shown in FIG. 9 is one which relates to a smart vortex generator demonstrating a bidirectional characteristic by means of a combination of a shape memory alloy's one-way shape memory effect and a bias force comprising a spring force and a fluidic force, and is one in which the shapes of the main body 3 and blade spring 4 are modified; and additionally in which the placement direction of the smart vortex generator 1 with respect to the main wing 2a is modified, in said Embodiment Mode 1.

Specifically, the main body 3 in this embodiment mode is one which is formed integrally by means of bending a strip-shaped plate-shape body (or a flat plate) comprising a shape memory alloy; in a shape-memorized configuration of the shape memory alloy, it comprises a substantially-plate-shaped base portion 6, which is disposed at one of the opposite end sides of the strip-shaped body and which is fixed onto the main wing 2a's top surface by means of bolts 5,5, and a substantially-plate-shaped vortex generating portion 7, which is disposed at the other one of the opposite end sides of the strip-shaped body and which rises so as to stand up from the one of the opposite end sides of the base portion 6 continuously and integrally. Note that, in the base portion 6, two bolt-insertion through holes (not shown) are penetrated therethrough.

In the same manner as said Embodiment Mode 1, in this main body 3, the configuration of the shape memory alloy is subjected to a memorizing treatment so that the vortex generating portion 7 turns into such a rise posture that it rises at predetermined rise angle with respect to the base portion 6 by bending or curving from the base portion 6 (or an elevation angle of the vortex generating portion 7, which rises but inclines with respect to a horizontal plane involving the base portion 6 (or an angle that the horizontal plane and the vortex generating portion 7 make)).

Moreover, the blade spring 4 has a bow-shaped horizontal-cross-sectional configuration, which curves so as to warp in such a natural state that no load is applied thereto from the outside; and, in the same manner as said Embodiment Mode 1, it is installed to the main body 3 so that the convex curved surface, which is curved in a bow shape, faces the main body 3's rear-surface side (or the main body 3's flexed convex side or curved convex side). And, adjacent to one of the opposite side ends of the strip-shaped blade spring 4, two bolt-insertion through holes (not shown) are penetrated therethrough. Moreover, at the other one of the opposite side ends of the bow-shaped blade spring 4, a clip portion 11 with a cross-sectionally letter-"L" shape, which forms a groove portion into which the leading end of the main body 3's vortex generating portion 7 fits, is disposed by means of bending.

The smart vortex generator 1 according to the present embodiment mode having such a construction is put in service as described below. Into the groove portion of the blade spring 4's clip portion 11, the leading end of the main body 3's vortex generating portion 7 is fitted; and then, while elastically deforming the blade spring 4 along the shape of the main body 3, the main body 3's base portion 6 is fixed onto the top surface of the airplane 2's main wing 2a along with the blade spring 4 by means of the bolts 5, 5, which are put through the bolt-insertion through holes of the main body 3 and blade spring 4. On this occasion, the smart vortex generator 1 according to this embodiment mode is placed on the top surface of the airplane 2's main wing 2a so that the strip-shaped main body 3 and blade spring 4 are disposed substantially parallelly with respect to the flowing direction of fluid upon flying (or the arrowheaded direction A in FIG. 9); and so that the flow of fluid upon flying runs into the plate surface of the vortex generating portion 7 of the main body 3 (or a front-side surface, the main body 3's flexed concave side or curved concave side), which is put into a first form shown in FIG. 9. Note that, in such a state that it is placed on the airplane 2's main wing 2a, an upstream side which is disposed backward in the flowing direction of fluid upon flying (or the airplane 2's forward side) becomes one of the opposite sides of said strip shape, and a downstream side which is disposed ahead in the flowing direction (or the airplane 2's rearward side) becomes the other one of the opposite end sides of said strip shape.

In this smart vortex generator 1, when demonstrating a flow-separation suppressing function upon the takeoff and landing of the airplane 2, the main body 3's vortex generating portion 7 turns into such a favorable or optimum rise posture that it bends or curves from the base portion 6 at a predetermined rise angle with respect to the base portion 6, and thereby the form of the main body 3 is maintained to a first form (or the state in FIG. 9). Moreover, when demonstrating a turbulent-flow suppressing function upon the cruising of the airplane 2, the main body 3's vortex generating portion 7 inclines from said rise posture to turn into such an optimum inclined posture that the vortex generating portion 7 lies down so as to be superimposed over along the main wing 2a' surface, and thereby the form of the main body 3 is maintained to a second form.

Since the other constructions and operations/effects are the same as those of said Embodiment Mode 1, their descriptions are omitted herein by making reference to their explanations on said Embodiment Mode 1.

Embodiment Mode 4

Figure 10:
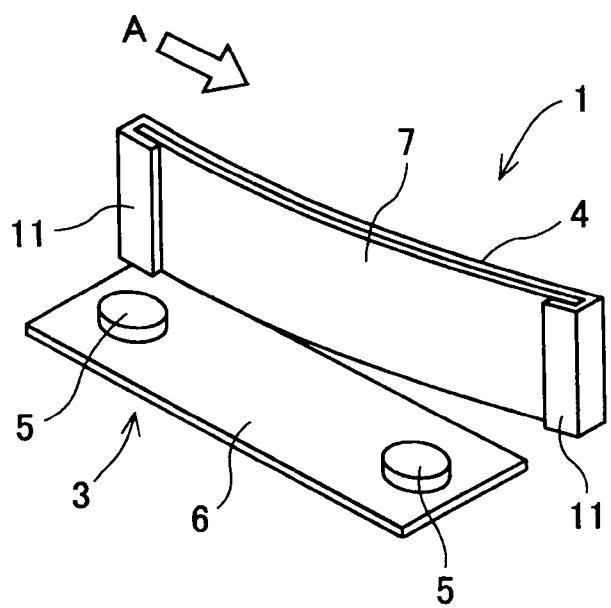
FIG. 10 is directed to Embodiment Mode 4, and is a perspective view of a smart vortex generator whose main body is put into a first form.

In the same manner as said Embodiment Mode 1, the present embodiment mode shown in FIG. 10 is one which relates to a smart vortex generator demonstrating a bidirectional characteristic by means of a combination of a shape memory alloy's one-way shape memory effect and a bias force comprising a spring force and a fluidic force, and is one in which the shapes, and the like, of the main body 3 and blade spring 4 are modified; and additionally in which the placement direction of the smart vortex generator 1 with respect to the main wing 2a is modified, in said Embodiment Mode 1.

Specifically, the main body 3 in this embodiment mode comprises a base portion 6, which is formed as a strip shape and which comprises a substantially-flat-plate-shaped light alloy, and a strip-shaped vortex generating portion 7 in which one end on one of its own opposite sides is fastened onto one end on one of the strip-shaped base portion 6's opposite sides and which rises at an angle of 90 degrees substantially with respect to the base portion 6. Note that, in the base portion 6, two bolt-insertion through holes (not shown) are penetrated therethrough.

And, of the main body 3, the vortex generating portion 7 is one which is formed by means of bending a strip-shaped plate-shaped body (or a flat plate) comprising a shape memory alloy. This vortex generating portion 7 is such that, in a shape-memorized configuration of the shape memory alloy, the one of the strip-shaped opposite plate's ends, which is fastened onto the base portion 6, is formed as a flat shape; and the other one of the strip-shaped plate's opposite ends, the free end, is formed as a shape, which flexes or curves so as to separate from the one end on one of the base portion 6's opposite sides. Namely, the vortex generating portion 7 is such that the configuration of the shape memory alloy is subjected to a memorizing treatment so that one of the opposite sides of the strip-shaped vortex generating portion 7 rises at a rise angle of 90 degrees substantially with respect to the base portion 6 onto which it is fastened; and additionally so that the free-end side, the other one of the opposite end sides of the strip-shaped vortex generating portion 7, turns into such a flexed or curved shape that it separates from the one end on one of the base portion 6's opposite sides.

Moreover, the blade spring 4, except later-described clip portions, is formed as a strip-shaped substantially-flat plate-shaped configuration in such a natural state that no load is applied thereto from the outside. And, at both ends of the strip-shaped blade spring 4, clip portions 11, 11 with a cross-sectionally letter-"L" shape, which form groove portions into which the opposite ends of the strip-shaped vortex generating portion 7 is fitted, respectively, are disposed by means of bending.

The smart vortex generator 1 according to the present embodiment mode having such a construction is put in service as described below. Into the groove portions of the blade spring 4's clip portions 11, 11, the opposite ends of the main body 3's vortex generating portion 7 are fitted while elastically deforming the blade spring 4 along the shape of the vortex generating portion 7 of the main body 3; and then the main body 3's base portion 6 is fixed onto top surface of the airplane 2's the main wing 2a by means of the bolts 5, 5, which are put through the bolt-insertion through holes of the main body 3's base portion 6. On this occasion, the smart vortex generator 1 according to this embodiment mode is placed on the top surface of the airplane 2's main wing 2a so that the main body 3's strip-shaped base portion 6, and the like, extend substantially parallelly with respect to the flowing direction of fluid upon flying (or the arrowheaded direction A in FIG. 10); and so that the flow of fluid upon flying runs into the plate surface (or a front-side surface, the main body 3's flexed concave side or curved concave side) of the vortex generating portion 7 of the main body 3, which is put into a first form shown in FIG. 10. Note that, in such a state that it is placed on the airplane 2's main wing 2a, a retreat side (or the airplane 2's forward side), which is disposed backward in the flowing direction of fluid upon flying, becomes one of the opposite end sides of said strip shape, and an advance side (or the airplane 2's rearward side), which is disposed ahead in the flowing direction, becomes the other one of the opposite end sides of said strip shape.

In this smart vortex generator 1, when demonstrating a flow-separation suppressing function upon the takeoff and landing of the airplane 2, the vortex generating portion 7's free-end side turns into such a flexed or curved shape that it separates from the one of the opposite side ends of the base portion 6 as the main body 3's vortex generating portion 7 rises at a rise angle of 90 degrees substantially with respect to the base portion 6, and thereby the form of the main body 3 is maintained to a first form (or the state in FIG. 10). Moreover, when demonstrating a turbulent-flow suppressing function upon the cruising of the airplane 2, the main body 3's vortex generating portion 7 deforms so that its base end side is superimposed over along a line of the base portion 6 by means of the blade spring 4's spring force and a fluidic force upon cruising, and then it turns into such a posture that it extends parallelly along the flow of fluid as it rises at a rise angle of 90 degrees substantially with respect to the base portion 6, and thereby the form of the main body 3 is maintained to a second form.

Since the other constructions and operations/effects are the same as those of said Embodiment Mode 1, their descriptions are omitted herein by making reference to their explanations on said Embodiment Mode 1.

Embodiment Mode 5

Figure 11:
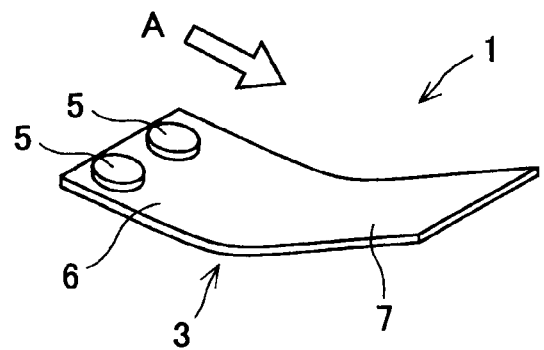
FIG. 11 is directed to Embodiment Mode 5, and is a perspective view of a smart vortex generator whose main body is put into a first form.

The present embodiment mode shown in FIG. 11 is one which relates to a smart vortex generator demonstrating a bidirectional characteristic by means of a combination of a shape memory alloy's one-way shape memory effect and a bias force comprising a fluidic force, and is one in which the shape, and the like, of the main body 3 are modified; and additionally in which the placement direction of the smart vortex generator 1 with respect to the main wing 2a is modified; and which is made free of the blade spring 4 as auxiliary-force giving means, in said Embodiment Mode 1.

Specifically, in the same manner as said Embodiment Mode 3, the smart vortex generator 1 according to this embodiment mode is placed on the top surface of the airplane 2's main wing 2a so that the main body 3 extends substantially parallelly with respect to the flowing direction of fluid upon flying (or the arrowheaded direction A in FIG. 11); and so that the flow of fluid upon flying runs into the plate surface (or a front-side surface, the main body 3's flexed concave side or curved concave side) of the vortex generating portion 7 of the main body 3, which is put into a first form shown in FIG. 11.

Moreover, in the same manner as said Embodiment Mode 3, the main body 3 in this embodiment mode is one which is formed integrally by means of bending a strip-shaped plate-shaped body (or a flat plate), which comprises a shape memory alloy; in a shape-memorized configuration of the shape memory alloy, it comprises a substantially-plate-shaped base portion 6, which is disposed at one of the opposite end sides of the strip shape and which is fixed onto the main wing 2a's top surface by means of bolts 5,5, and a substantially-plate-shaped vortex generating portion 7, which is disposed at the other one of the opposite end sides of the strip shape and which rises so as to stand up from the one of the opposite end sides of the base portion 6 continuously and integrally. Note that, in the base portion 6, two bolt-insertion through holes (not shown) are penetrated therethrough.

In the same manner as said Embodiment Mode 1, in this main body 3, the configuration of the shape memory alloy is subjected to a memorizing treatment so that the vortex generating portion 7 turns into such a rise posture that it rises at predetermined rise angle (or an elevation angle of the vortex generating portion 7, which rises but inclines with respect to a horizontal plane involving the base portion 6 (or an angle that the horizontal plane and the vortex generating portion 7 make)) with respect to the base portion 6 by bending or curving from the base portion 6.

In the service conditions of the smart vortex generator 1 according to the present embodiment mode, the shape memory alloy, which constitutes the main body 3, is one which turns into an austenitic phase during at least a part of the airplane 2's takeoff and landing; and which turns into a martensitic phase (or a stress-induced martensitic phase) during the airplane 2's cruising. Namely, this shape memory alloy is such that the alloy composition (or components or combining ratios) or heat treatment conditions, and the like, are adjusted so that an assumed air temperature at low altitude upon the airplane 2's takeoff and landing (or a specific value of high-temperature-side assumed temperatures) is an austenitic transformation finish temperature or more of the shape memory alloy in such a state that it receives an external load, which acts onto the shape memory alloy during flying; and so that an assumed air temperature at high altitude upon the airplane 2's cruising (or cruising altitude) (or a specific value of low-temperature-side assumed temperatures) is a martensitic transformation finish temperature or less of the shape memory alloy in such a state that it receives the same external load.

Specifically, the smart vortex generator 1 according to the present embodiment mode is configured so that, when a temperature of said fluid reaches a transformation start temperature of said shape memory alloy in such a state that it receives an external load, which acts onto said shape memory alloy during flying, in a temperature decrement process, said shape memory alloy starts transforming from an austenitic phase to a martensitic phase; and so that, when the temperature of said fluid reaches a reverse transformation start temperature of said shape memory alloy in such a state that it receives said external load in a temperature increment process, said shape memory alloy starts transforming reversely from a martensitic phase to an austenitic phase.

Here, in the present embodiment mode, the fluidic force of fluid around the main body 3 during flying becomes said external load acting onto the shape memory alloy in service. Moreover, the fluidic force of fluid, which acts onto the main body 3 from the arrowheaded direction A in FIG. 11 during flying becomes the bias force required for letting the shape memory alloy, which exhibits a one-way shape memory effect, demonstrate a multi-directional characteristic.

And, in the smart vortex generator 1 according to the present embodiment mode, while taking the assumed temperatures, the fluidic force of fluid, which acts onto the main body 3, and the like, upon takeoff and landing and upon cruising into account as a whole, the stress-strain characteristic of the shape memory alloy, which constitutes the main body 3, is set so as to effect as follows. When a temperature of fluid is the high-temperature-side assumed temperature or more, that is, in at least a part when the airplane 2, in which the smart vortex generators 1 are installed on the main wing 2a's top surface, takes off and lands (or in a part of the takeoff and landing process, when the altitude is on a lower side), the main body 3's vortex generating portion 7 turns into an optimum or satisfactory rise posture (or the form of the main body 3 turns into an optimum or satisfactory first form) as shown in FIG. 11, and thereby it is capable of demonstrating an optimum or satisfactory separation suppressing function; and, during the same airplane 2' cruising (or when the temperature of fluid is the low-temperature-side assumed temperature or less), the main body 3's vortex generating portion 7 turns into an optimum inclined posture in such a state that it inclines from the rise posture to lie down so as to be superimposed over along the main wing 2a' surface, or such a satisfactory inclined posture that it inclines from the rise posture by a predetermined magnitude, (or the form of the main body 3 turns into an optimum or satisfactory second form), and thereby it is capable of demonstrating an optimum or satisfactory turbulent-flow suppressing function.

In this smart vortex generator 1, a fluidic force of fluid, which flows on the main wing 2a's surface during flying, is utilized as a bias force, which is required for giving a multi-directional characteristic with respect to the main body 3 that is constituted of a shape memory alloy exhibiting a one-way shape memory effect. Namely, in this smart vortex generator 1, a fluidic force, which acts onto the main body 3 from the arrowheaded direction A in FIG. 11 during flying, is given to the shape memory alloy, which exhibits a one-way shape memory effect, as a bias force. Accordingly, by means of the balance between the shape memory alloy's stress-strain characteristic, which changes depending on a fluidic temperature, and the fluidic force, which is given to the shape memory alloy as a bias force, the shape memory alloy undergoes a phase transformation to turn into an austenitic phase, or to turn into a martensitic phase, depending on a temperature increment/decrement of fluid, and thereby the form of the main body 3 turns into the first form, or turns into the second form.

Accordingly, by means of appropriately setting the stress-strain characteristic of a shape memory alloy, which exhibits a one-way shape memory effect, depending on a fluidic force, which acts onto the main body 3 from the arrowheaded direction A in FIG. 11 during flying, it is possible to securely maintain the main body 3 to the first form or to the second form depending on a temperature increment/decrement of fluid. Note that, since the fluidic force, which acts onto the main body 3 from the arrowheaded direction A in FIG. 11 during flying, changes due to airplane's airspeed or angle of attack, and the like, it is necessary to appropriately set the shape memory's stress-strain characteristic while further taking this into consideration.

And, the main body 3 in this smart vortex generator 1 is such that, when a fluidic temperature around the main body 3 is the reverse transformation finish temperature or more of the shape memory alloy in such a state that it receives said external load, the vortex generating portion 7 rises at a predetermined rise angle (or an elevation angle of the vortex generating portion 7, which rises but inclines with respect to a horizontal plane involving the base portion 6 (or an angle that the horizontal plane and the vortex generating portion 7 make)) with respect to the base portion 6 to turn into said first form; and, when the fluidic temperature around the main body 3 is the transformation finish temperature or less of the shape memory alloy in such a state that it receives said external load, the vortex generating portion 7 turns into a predetermined inclined posture to turn into said second form.

Therefore, in this smart vortex generator 1, it is not necessary to dispose any auxiliary-force giving means separately, and thereby it contributes more to simplifying the structure and making it maintenance free because of the reduction of constituent component parts.

Since the other constructions and operations/effects are the same as those of said Embodiment Mode 1, their descriptions are omitted herein by making reference to their explanations on said Embodiment Mode 1.

Embodiment Mode 6

Figure 12:
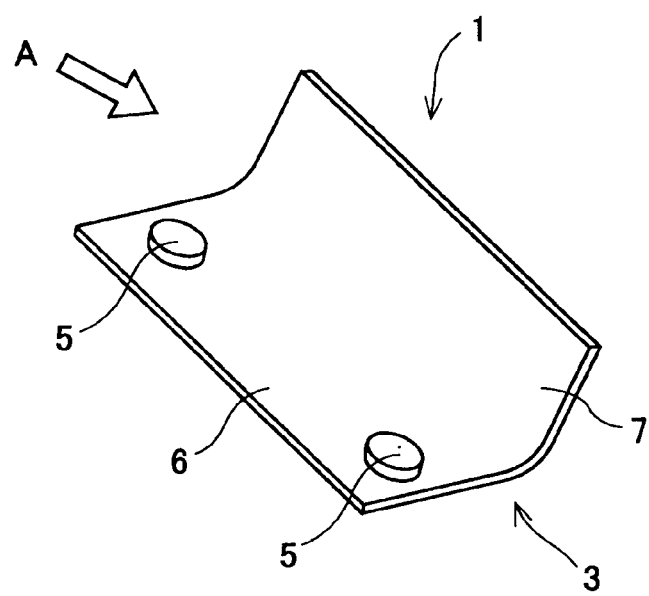
FIG. 12 is directed to Embodiment Mode 6, and is a perspective view of a smart vortex generator whose main body is put into a first form.

The present embodiment mode shown in FIG. 12 is one which relates to a smart vortex generator demonstrating a bidirectional characteristic by means of a combination of a shape memory alloy's two-way shape memory effect and a fluidic force around the main body 3, fluidic force which is loaded thereto inevitably, and is one in which the type of a shape memory alloy constituting the main body 3 is altered to one exhibiting a two-way shape memory effect and additionally which is made free of the blade spring 4 as auxiliary-force giving means, in said Embodiment Mode 1.

Specifically, the main body 3 in this embodiment mode is subjected to shape-memorizing treatments, respectively, so that it turns into said first form, a high-temperature-side shape-memorized configuration, on a higher temperature side, or at a reverse transformation finish temperature (or an austenitic transformation finish temperature, for instance) or more of a shape memory alloy, which constitutes the main body 3, in such a state that it receives an external load, which acts onto the shape memory alloy during flying; and so that it turns into said second form, a low-temperature-side shape-memorized configuration, on a lower temperature side, or at a transformation finish temperature (or a martensitic transformation finish temperature, for instance) or less of the shape memory alloy, which constitutes the main body 3, in such a state that it receives the external load, which acts onto the shape memory alloy during flying.

Although the method of subjecting it to such shape-memorizing treatments is not limited in particular, it is possible to employ methods by means of heavy processing, constrained heating, training and constrained aging, for instance.

For example, when creating a two-way shape memory effect by means of a heavy processing method, it is advisable to deform it by such a deformation magnitude that it undergoes work hardening moderately to such a region that it goes beyond a strain magnitude, which is recoverable by means of shape memory effect or super elasticity.

In the service conditions of the smart vortex generator 1 according to the present embodiment mode, the shape memory alloy, which constitutes the main body 3, is one which turns into an austenitic phase during at least a part of the airplane 2's takeoff and landing; and which turns into a martensitic phase (or a stress-induced martensitic phase) during the airplane 2's cruising. Namely, this shape memory alloy is such that the alloy composition (or components or combining ratios) or heat treatment conditions, and the like, are adjusted so that an assumed air temperature (or a specific value of high-temperature-side assumed temperatures) at low altitude upon the airplane 2's takeoff and landing is an austenitic transformation finish temperature or more of the shape memory alloy in such a state that it receives an external load, which acts onto the shape memory alloy during flying; and so that an assumed air temperature (or a specific value of low-temperature-side assumed temperatures) at high altitude (or cruising altitude) upon the airplane 2's cruising is a martensitic transformation finish temperature or less of the shape memory alloy in such a state that it receives the same external load.

Specifically, the smart vortex generator 1 according to the present embodiment mode is configured so that, when a temperature of said fluid reaches a transformation start temperature of said shape memory alloy in such a state that it receives an external load, which acts onto said shape memory alloy during flying, in a temperature decrement process, said shape memory alloy starts transforming from an austenitic phase to a martensitic phase; and so that, when the temperature of said fluid reaches a reverse transformation start temperature of said shape memory alloy in such a state that it receives said external load in a temperature increment process, said shape memory alloy starts transforming reversely from a martensitic phase to an austenitic phase.

Here, in the present embodiment mode, a fluidic force of fluid around the body 3 during flying becomes said external load, which acts onto the shape memory alloy in service. Moreover, the fluidic force is loaded onto the main body 3 inevitably from the arrowheaded direction A in FIG. 12 during flying.

And, in the smart vortex generator 1 according to the present embodiment mode, while taking the assumed temperatures, the fluidic force of fluid, which acts onto the main body 3, and the like, upon takeoff and landing and upon cruising into account as a whole, the stress-strain characteristic of the shape memory alloy, which constitutes the main body 3, is set so as to effect as follows. When the temperature of fluid is the high-temperature-side assumed temperature or more, that is, in at least a part when the airplane 2, in which the smart vortex generators 1 are installed on the main wing 2a's top surface, takes off and lands (or in a part of the takeoff and landing process when the altitude is on a lower side), the main body 3's vortex generating portion 7 turns into an optimum or satisfactory rise posture (or the form of the main body 3 turns into an optimum or satisfactory first form) as shown in FIG.

12, and thereby it is capable of demonstrating an optimum or satisfactory separation suppressing function; and, during the same airplane 2' cruising (or when the temperature of fluid is the low-temperature-side assumed temperature or less), the main body 3's vortex generating portion 7 turns into an optimum inclined posture in such a state that it inclines from the rise posture to lie down so as to be superimposed over along the main wing 2a' surface (or the form of main body 3 turns into an optimum second form), and thereby it is capable of demonstrating an optimum vortex suppressing function.

The other constructions of the main body 3 in the present embodiment mode are the same as those of said Embodiment Mode 1.

The main body 3 in this smart vortex generator 1 is such that, when a fluidic temperature around the main body 3 is the reverse transformation finish temperature or more of the shape memory alloy in such a state that it receives said external load, the vortex generating portion 7 rises at a predetermined rise angle (or an elevation angle of the vortex generating portion 7, which rises but inclines with respect to a horizontal plane involving the base portion 6 (or an angle that the horizontal plane and the vortex generating portion 7 make)) with respect to the base portion 6 to turn into said first form; and, when the fluidic temperature around the main body 3 is the transformation finish temperature or less of the shape memory alloy in such a state that it receives said external load, the vortex generating portion 7 turns into a predetermined inclined posture to turn into said second form.

Therefore, in this smart vortex generator 1, it is not necessary to dispose any auxiliary-force giving means separately, and thereby it contributes more to simplifying the structure and making it maintenance free because of the reduction of constituent component parts.

Since the other constructions and operations/effects are the same as those of said Embodiment Mode 1, their descriptions are omitted herein by making reference to their explanations on said Embodiment Mode 1.

Note that, in this Embodiment Mode 6, although an example has been described, example in which the form of the main body 3 changes between the first form and the second form by means of a combination of the two-way shape memory alloy's two-way shape memory effect and the fluidic force being loaded thereto inevitably, it is also possible to change the form of the main body 3 between the first form and the second form by means of a shape memory alloy's two-way shape memory effect, a fluidic force being loaded onto the main body 3 inevitably, and a supplementary force (or an elastic force, or a force resulting from a fluidic pressure or a weight, and the like), which is loaded thereto supplementally by means of supplementary force giving means. For example, in the smart vortex generators 1 being directed to said Embodiment Modes 1 through 4 that are equipped with the blade spring 4, by means of employing a two-way shape memory alloy for the shape memory alloy that constitutes the main body 3, and additionally by means of appropriately setting the blade spring 4's spring force, it is possible to change the form of the main body 3 between the first form and the second form by means of the shape memory alloy's two-way shape memory effect, a fluidic force being loaded onto the main body 3 inevitably, and the spring force as a supplementary force being loaded thereto supplementally.

Moreover, in the smart vortex generator 1 being directed to this Embodiment Mode 6, it is advisable to employ a one-way shape memory alloy exhibiting said one-way shape memory effect for the shape memory alloy that constitutes the main body 3 with the configuration shown in FIG. 12, and additionally it is advisable as well to utilize a fluidic force of fluid, fluidic force which acts onto the main body 3 from the arrow-headed direction A in FIG. 12 during flying, as a bias force being required for giving a multi-directional characteristic thereto.

Further, in the smart vortex generator 1 being directed to said Embodiment Mode 5, it is advisable as well to employ a two-way shape memory alloy for the shape memory alloy that constitutes the main body 3 with the configuration shown in FIG. 11.

Embodiment Mode 7

Figure 13:
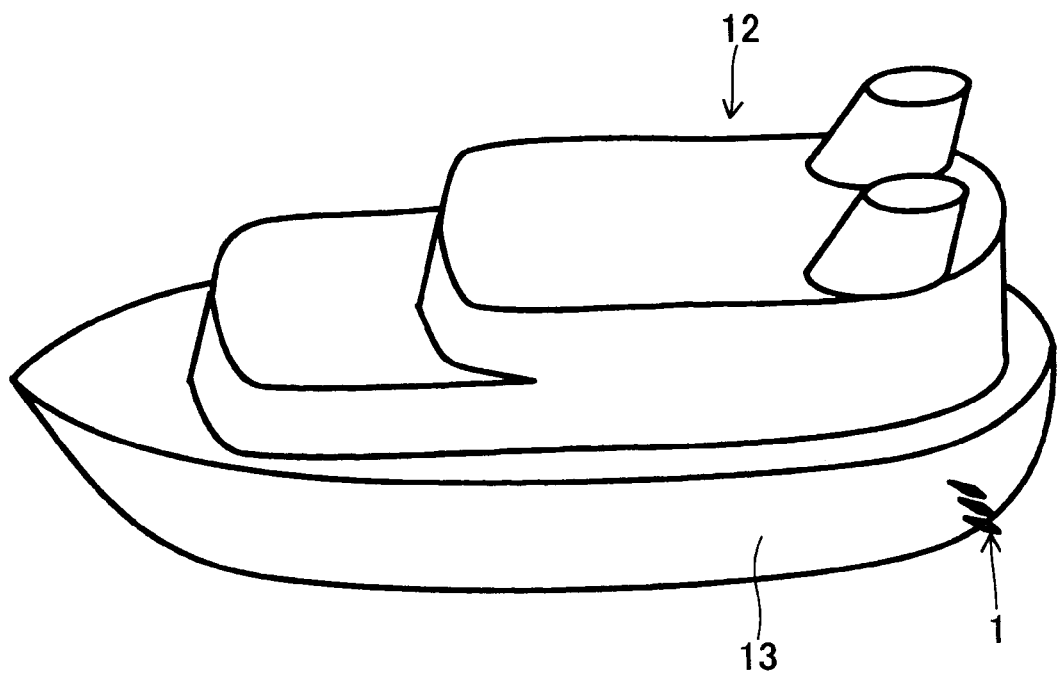
FIG. 13 is directed to Embodiment Mode 7, and is a perspective view for schematically illustrating a vessel in which smart vortex generators are placed on the hull.

The present embodiment mode shown in FIG. 13 is one in which the smart vortex generator according to the present invention is applied to a vessel.

Specifically, a vessel 12 shown in FIG. 13 is equipped with the smart vortex generators 1 which are placed on the hull 13's surface making a boundary to a flow of fluid, which suppress the flow separation occurring on the hull 13's surface, and which demonstrate a multi-directional characteristic depending on a temperature change of fluid.

The type and placement number of the smart vortex generators 1, which are placed on the surface of the vessel 12's hull 13, are not limited in particular. For example, it is possible to place such smart vortex generators 1 being specified in said Embodiment Modes 1 through 6 in a quantity of from a couple of pieces to dozens of pieces thereon.

The respective smart vortex generators 1 can be disposed on the hull 13's surface in a submerged portion of the hull 13's surfaces, or on a surface of wing (or hydrofoil) which is installed to the hull 13. The vessel 12 shown in FIG. 13 is such that a plurality of the smart vortex generators 1 are disposed on the opposite side surfaces of the hull 13's stern side (or a surface of the hull 13 in a submerged section of the hull 13's surface).

In the vessel 12 shown in FIG. 13, the respective smart vortex generators 1 are placed on the hull 13's surface in a quantity of plurality of pieces with intervals provided therebetween in the up/down direction. The respective smart vortex generators 1 are placed so that the plate surface of the vortex generating portion 7 faces obliquely with respect to a flow direction so as to let a flow of fluid upon navigating run into the plate surface of the vortex generating portion 7 of the main body 3, which is put into the first form. Moreover, the respective smart vortex generators 1 are placed on the hull 13's surface so that the main body 3's base portion 6, and the like, extend substantially parallelly with respect to the flow direction of fluid during navigation; and so that the flow of fluid during navigation runs into the plate surface of the vortex generating portion 7 of the main body 3 (or a front-side surface, the main body 3's flexed concave side or curved concave side), which is put into the first form. And, these smart vortex generators 1 suppress flow separation, which occurs on the hull 13's surface making a boundary to a flow of fluid; and moreover demonstrate a bidirectional characteristic depending on a temperature change of fluid.

Specifically, in these smart vortex generators 1, as for the shape memory alloy that constitutes the main body 3, it is possible to employ one which turns into the high-temperature-side stable phase (or an austenitic phase, for instance) in a part during the vessel 12's navigation (or within a temperature range where a temperature of fluid becomes a high-temperature-side assumed temperature or more); and which turns into the low-temperature-side stable phase (or a martensitic phase (or a stress-induced martensitic phase), for instance) in the other part during the vessel 12's navigation (or within a temperature range where a temperature of fluid becomes a low-temperature-side assumed temperature or less); in the service conditions of the smart vortex generator 1 according to one of the embodiment modes. For example, this shape memory alloy is such that it is possible to adjust the alloy composition (or components or combining ratios) or heat treatment conditions, and the like, so that an assumed temperature (or a specific value of high-temperature-side assumed water temperatures) in a part during navigation is an austenitic transformation finish temperature or more of the shape memory alloy in such a state that it receives an external load, which acts onto the shape memory alloy during navigation; and so that an assumed temperature in another part during navigation is (or a specific value of low-temperature-side assumed water temperatures) a martensitic transformation finish temperature or less of the shape memory alloy in such a state that it receives the same external load.

Figure 14:
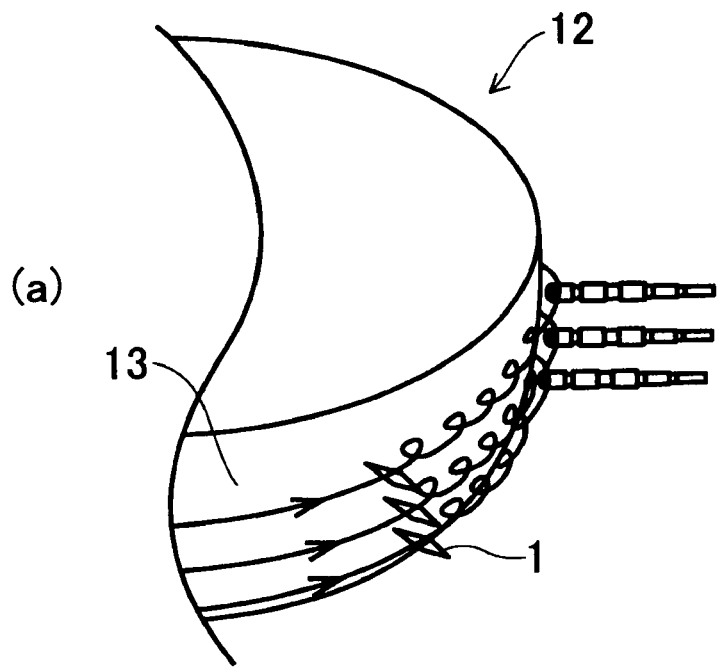
FIG. 14 is one which illustrates flows on a vessel's hull surface schematically.
Figure 14:
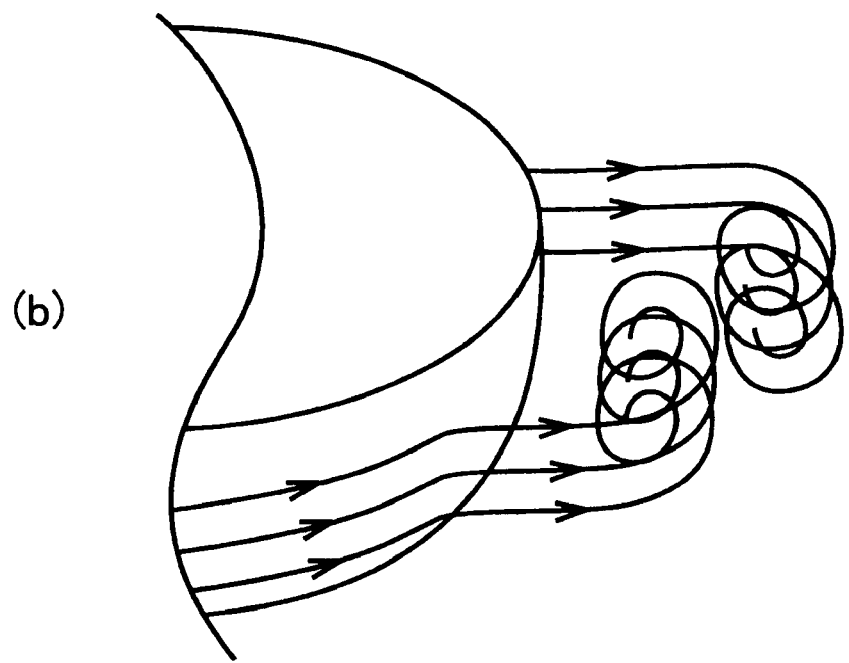

Accordingly, the vessel 12 in which the smart vortex generators 1 are disposed on the hull 13's surface is such that the main body 3's vortex generating portion 7 turns into an optimum or satisfactory rise posture (or the form of the main body 3 turns into an optimum or satisfactory first form) in a part during the vessel 12's navigation (or within a temperature range where a temperature of fluid becomes a high-temperature-side assumed temperature or more, for instance), thereby demonstrating an optimum or satisfactory separation suppressing function. Thus, the main body 3's vortex generating portion 7 generates vortexes on the hull 13's surface, thereby inhibiting flows from separating from the hull 13's surface effectively (see FIG. 14(*a*)). Note that FIG. 14(*a*) is a diagram for explaining an appearance how the separation of flows is suppressed from the hull 13's surface on which vortex generators are disposed; and that FIG. 14(*b*) is a diagram for explaining an appearance how flows separate from a hull surface on which no vortex generator is disposed.

And, in another part during the vessel 12's navigation (or within a temperature range where the temperature of fluid becomes a low-temperature-side assumed temperature or less, for instance), the main body 3's vortex generating portion 7 turns into an optimum inclined posture in such a state that it inclines from the rise posture to lie down so as to be superimposed over along the hull 13's surface, or such a satisfactory inclined posture that it inclines from the rise posture by a predetermined magnitude, (or the form of the main body 3 turns into an optimum or satisfactory second form), thereby demonstrating an optimum or satisfactory turbulent-flow suppressing function.

Note that, in this Embodiment Mode 7, although an example has been described, example in which the main body 3 maintains the first form when a temperature of fluid becomes a high-temperature-side assumed temperature or more; and the main body 3 maintains the second form when the temperature of fluid becomes a low-temperature-side assumed temperature or less; on the contrary, it is advisable as well to adapt it so that the main body 3 maintains the first form when a temperature of fluid becomes a low-temperature-side assumed temperature or less; and the main body 3 maintains the second form when the temperature of fluid becomes a high-temperature-side assumed temperature or more.

Embodiment Mode 8

Figure 15:
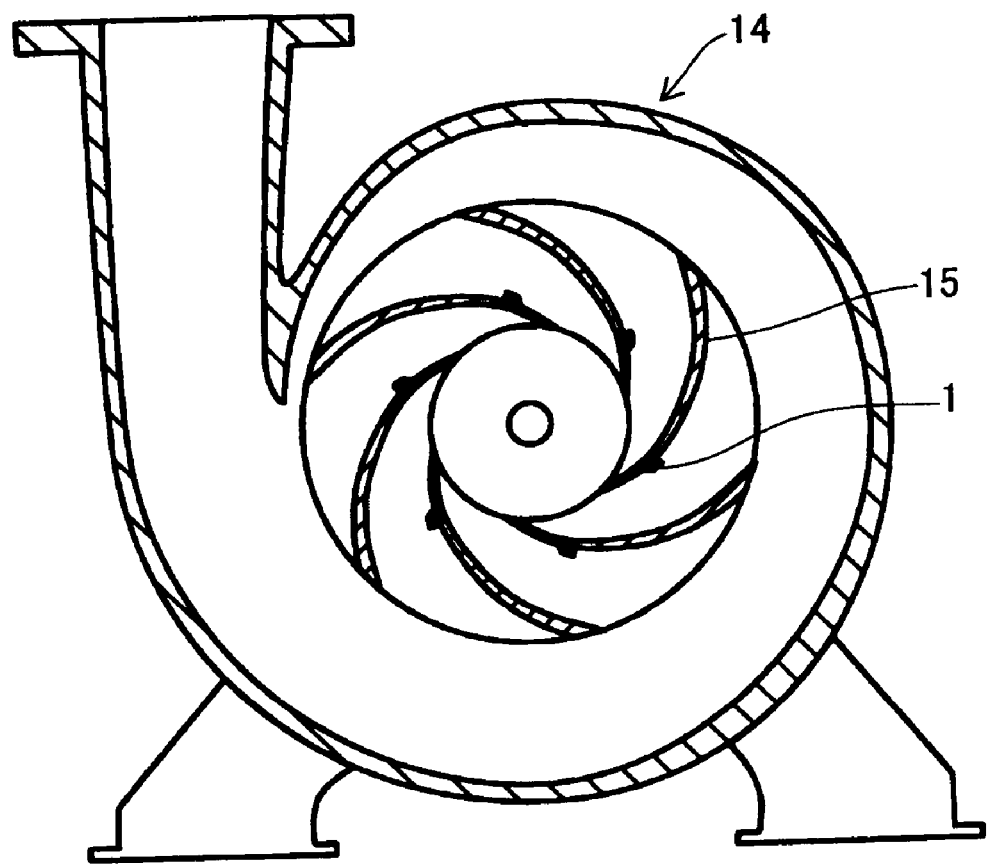
FIG. 15 is directed to Embodiment Mode 8, and is a perspective view for schematically illustrating a turbo pump in which smart vortex generators are placed on the impeller blades.

The present embodiment mode shown in FIG. 15 is one in which the smart vortex generator according to the present invention is applied to a turbo pump, a rotary machine.

Specifically, a turbo pump 14 shown in FIG. 15 is equipped with impeller blades 15, and the smart vortex generators 1 which are placed on the impeller blades 15's surface making a boundary to a flow of fluid, which suppress the flow separation occurring on the impeller blades 15's surface, and which demonstrate a multi-directional characteristic depending on a temperature change of fluid.

The type and placement number of the smart vortex generators 1, which are placed on the surface of the turbo pump 14's impeller blades 15, are not limited in particular. For example, it is possible to place such smart vortex generators 1 being specified in said Embodiment Modes 1 through 6 in a quantity of from a couple of pieces to dozens of pieces thereon.

The respective smart vortex generators 1 are placed adjacent to the root side of the impeller blades 15, respectively, so that the plate surface of the vortex generating portion 7 faces obliquely with respect to a flow direction so as to let a flow of fluid run into the plate surface of the vortex generating portion 7 of the main body 3, which is put into the first form. Moreover, the respective smart vortex generators 1 are placed on the impeller blades 15's surface so that the main body 3's base portion 6, and the like, extend substantially parallelly with respect to a flow of fluid during operation; and so that the flow of fluid during operation runs into the plate surface of the vortex generating portion 7 of the main body 3 (or a front-side surface, the main body 3's flexed concave side or curved concave side), which is put into the first form. And, these smart vortex generators 1 suppress flow separation, which occurs on the impeller blades 15's surface making a boundary to a flow of fluid; and moreover demonstrate a bidirectional characteristic depending on a temperature change of fluid.

Specifically, in these smart vortex generators 1, as for the shape memory alloy that constitutes the main body 3, it is possible to employ one which turns into the high-temperature-side stable phase (or an austenitic phase, for instance) in a part during the turbo pump 14's operation (or within a temperature range where a temperature of fluid becomes a high-temperature-side assumed temperature or more); and which turns into the low-temperature-side stable phase (or a martensitic phase (or a stress-induced martensitic phase), for instance) in another part during the turbo pump 14's operation (or within a temperature range where the temperature of fluid becomes a low-temperature-side assumed temperature or less); in the service conditions of the smart vortex generator 1 according to the present embodiment mode. For example, this shape memory alloy is such that it is possible to adjust the alloy composition (or components or combining ratios) or heat treatment conditions, and the like, so that an assumed temperature in a part during operation (or a specific value of high-temperature-side assumed temperatures) is an austenitic transformation finish temperature or more of the shape memory alloy in such a state that it receives an external load, which acts onto the shape memory alloy during running; and so that an assumed temperature (or a specific value of low-temperature-side assumed temperatures) in the other part during operation is a martensitic transformation finish temperature or less of the shape memory alloy in such a state that it receives the same external load.

Figure 16:
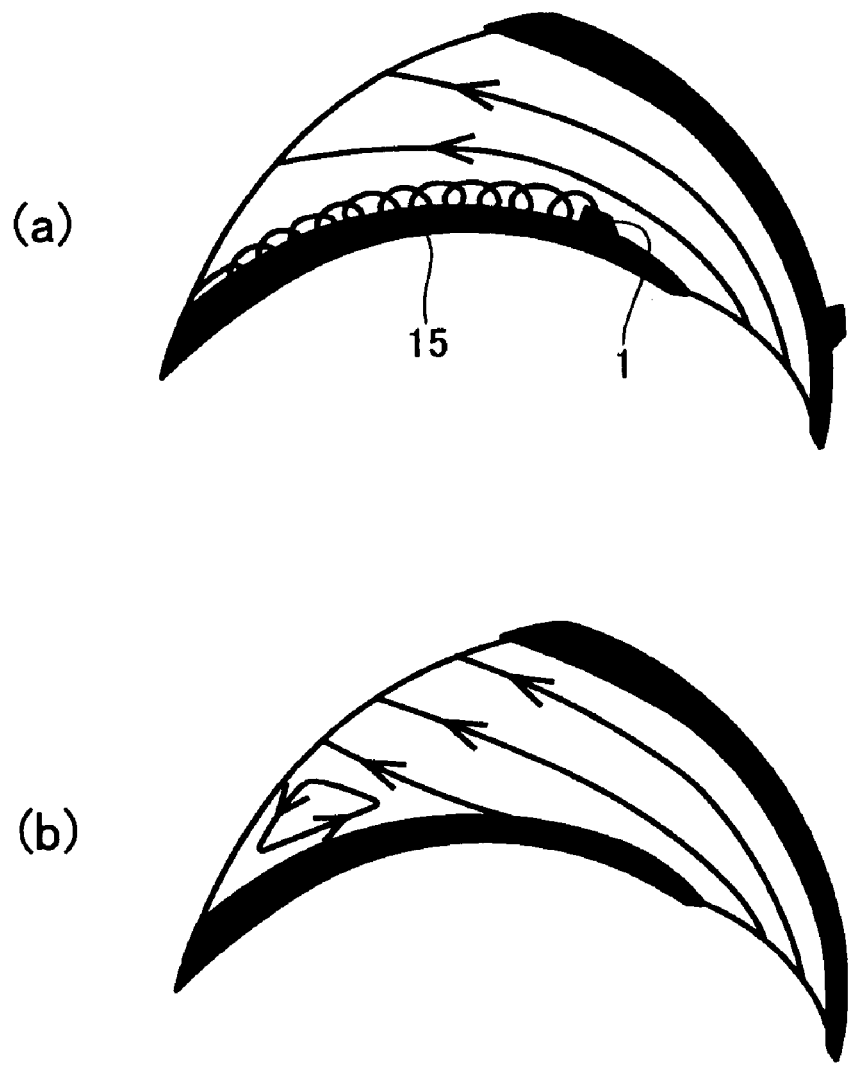
FIG. 16 is one which illustrates flows on a turbo pump's impeller-blade surface schematically.

Accordingly, the turbo pump 14 in which the smart vortex generators 1 are disposed on the impeller blades 15's surface is such that the main body 3's vortex generating portion 7 turns into an optimum or satisfactory rise posture (or the form of the main body 3 turns into an optimum or satisfactory first form) in a part during the turbo pump 14's operation (or within a temperature range where a temperature of fluid becomes a high-temperature-side assumed temperature or more, for instance), thereby demonstrating an optimum or satisfactory separation suppressing function. Thus, the main body 3's vortex generating portion 7 generates vortexes on the impeller blades 15's surface, thereby inhibiting flows from separating from the impeller blades 15's surface effectively (see FIG. 16(*a*)). Note that FIG. 16(*a*) is a diagram for explaining an appearance how the separation of flows is suppressed from the impeller blade 15's surface on which a vortex generator is disposed; and that FIG. 16(*b*) is a diagram for explaining an appearance how flows separate from an impeller blade's surface on which no vortex generator is disposed.

And, in the other part during the turbo pump 14's operation (or within a temperature range where the temperature of fluid becomes a low-temperature-side assumed temperature or less, for instance), the main body 3's vortex generating portion 7 turns into an optimum inclined posture in such a state that it inclines from the rise posture to lie down so as to be superimposed over along the impeller blades 15's surface, or such a satisfactory inclined posture that it inclines from the rise posture by a predetermined magnitude, (or the form of the main body 3 turns into an optimum or satisfactory second form), thereby demonstrating an optimum or satisfactory turbulent-flow suppressing function.

Note that, in this Embodiment Mode 8, although an example has been described, example in which the main body 3 maintains the first form when a temperature of fluid becomes a high-temperature-side assumed temperature or more; and the main body 3 maintains the second form when the temperature of fluid becomes a low-temperature-side assumed temperature or less; on the contrary, it is advisable as well to adapt it so that the main body 3 maintains the first form when a temperature of fluid becomes a low-temperature-side assumed temperature or less; and the main body 3 maintains the second form when the temperature of fluid becomes a high-temperature-side assumed temperature or more.

Second Embodiment Mode

This Second Embodiment Mode is one which relates to a smart vortex generator demonstrating a bidirectional characteristic depending on a fluidic force of fluid.

Embodiment Mode 9

This Embodiment Mode 9 is one which relates to a smart vortex generator demonstrating a bidirectional characteristic by means of a combination of a super-elastic effect of shape memory alloy and a fluidic force. Moreover, this embodiment mode is one in which the smart vortex generator according to the present invention is applied to an airplane, an aircraft, more concretely, a low-flying airplane (or a propeller airplane, for instance).

Specifically, this embodiment mode is one in which, in said Embodiment Mode 5, the type of the shape memory alloy, which constitutes the main body 3 in the smart vortex generator 1 shown in FIG. 11, is altered.

A shape memory alloy, which constitutes the main body 3 in this embodiment mode, is one which exhibits a predetermined super-elastic effect; and, in the service conditions of the smart vortex generator 1 according to the present embodiment mode, it is one which turns into an austenitic phase in at least a part during the airplane 2's takeoff and landing; and which turns into a martensitic phase (or a stress-induced martensitic phase) during the airplane 2's cruising; and it is such that the alloy composition (or components or combining ratios) or heat treatment conditions, and the like, are adjusted so that an assumed fluidic force (or a specific value of low-load-side assumed loads) upon the airplane 2's takeoff and landing is an austenitic transformation finish stress or less of the shape memory alloy; and so that an assumed fluidic force upon the airplane 2's cruising (or a specific value of high-load-side assumed loads) is a martensitic transformation finish stress or more of the shape memory alloy.

Specifically, the smart vortex generator 1 according to the present embodiment mode is configured so that, when a fluidic force of said fluid reaches a transformation start stress of said shape memory alloy in an increment process, said shape memory alloy starts transforming from an austenitic phase to a martensitic phase; and so that, when the fluidic force of said fluid reaches a reverse transformation start stress of said shape memory alloy in a decrement process, said shape memory alloy starts transforming reversely from the martensitic phase to the austenitic phase.

Moreover, in the present embodiment mode, such a case is assumed that there is no great difference between a fluidic temperature upon the airplane 2's takeoff and landing and a fluidic temperature upon the airplane 2's cruising. Further, such a case is assumed that the airplane 2's airspeed is faster upon cruising than it is upon takeoff and landing; and that a fluidic force of fluid, which acts onto the main body 3 from the arrowheaded direction A in FIG. 11 during flying, is greater by a predetermined magnitude upon cruising than the one upon takeoff and landing.

And, in the smart vortex generator 1 according to the present embodiment mode, while taking the assumed loads upon takeoff and landing and upon cruising into account, the stress-strain characteristic of the shape memory alloy, which constitutes the main body 3, is set so as to effect as follows. When a fluidic force of fluid is the low-load-side assumed load or less, that is, in at least a part when the airplane 2, in which the smart vortex generators 1 are installed on the main wing 2*a*'s top surface, takes off and lands (or in a part of the takeoff and landing process, when the fluidic force is on a lower side), the main body 3's vortex generating portion 7 turns into an optimum or satisfactory rise posture (or the form of the main body 3 turns into an optimum or satisfactory first form) as shown in FIG. 11, and thereby it is capable of demonstrating an optimum or satisfactory separation suppressing function; and so that, during the same airplane 2's cruising (or when the fluidic force of fluid is the high-load-side assumed load or more), the main body 3's vortex generating portion 7 turns into an optimum inclined posture in such a state that it inclines from the rise posture to lie down so as to be superimposed over along the main wing 2*a*' surface, or such a satisfactory inclined posture that it inclines from the rise posture by a predetermined magnitude, (or the form of the main body 3 turns into an optimum or satisfactory second form), and thereby it is capable of demonstrating an optimum or satisfactory turbulent-flow suppressing function. Note that, since the fluidic force, which acts onto the main body 3 from the arrowheaded direction A in FIG. 11 during flying, changes due to airplane's airspeed or angle of attack, and the like, it is necessary to appropriately set the shape memory's stress-strain characteristic while further taking this into consideration.

For example, let us consider a case where a fluidic temperature upon this airplane 2's takeoff and landing and that upon cruising are 10° C. substantially and are constant, as shown in FIG. 6, according to the stress-strain characteristic of shape memory alloy at a temperature of 10° C., the deformation of shape memory alloy is small when the fluidic force is below 350 MPa approximately; and then the shape memory alloy deforms greatly when the fluidic force goes beyond 350 MPa approximately. From this fact, by setting a transformation stress of shape memory alloy between the low-load-side assumed load upon takeoff and landing and a high-load-side assumed load upon cruising, the shape memory alloy turns into an austenitic phase, the low-load-side stable phase, during takeoff and landing, and thereby the main body 3 turns into the first form, a shape-memorized configuration; and moreover the shape memory alloy turns into a martensitic phase, the high-load-side stable phase, during cruising, and thereby the main body 3 turns into the second form.

Therefore, in this smart vortex generator 1, it is not necessary to dispose any auxiliary-force giving means separately, and thereby it contributes more to simplifying the structure and making it maintenance free because of the reduction of constituent component parts.

Since the other constructions and operations/effects are the same as those of said Embodiment Modes 1 and 5, their descriptions are omitted herein by making reference to the explanations on said Embodiment Modes 1 and 5.

Embodiment Mode 10

This Embodiment Mode 10 is one which relates to a smart vortex generator demonstrating a bidirectional characteristic by means of a combination of a super-elastic effect of shape memory alloy and a fluidic force. Moreover, this embodiment mode is one in which the smart vortex generator according to the present invention is applied to a vessel.

Similarly to Embodiment Mode 9, this embodiment mode is one in which, in said Embodiment Mode 5, the type of the shape memory alloy, which constitutes the main body 3 in the smart vortex generator 1 shown in FIG. 11, is altered.

A shape memory alloy, which constitutes the main body 3 in this embodiment mode, is such that it is possible to employ one which exhibits a predetermined super-elastic effect; which turns into a low-load-side stable phase (or an austenitic phase, for instance) during a part of the vessel 12's navigation (or within a load range where a fluidic force of fluid becomes a low-load-side assumed load or less); and which turns into a high-load-side stable phase (or a martensitic phase (or a stress-induced martensitic phase), for instance) during the other part of the vessel 12's navigation (or within a load range where the fluidic force of fluid becomes a high-load-side assumed load or more); in the service conditions of the smart vortex generator 1 according to the present embodiment mode. For example, this shape memory alloy is such that it is possible to adjust the alloy composition (or components or combining ratios) or heat treatment conditions, and the like, so that an assumed load during a part of the vessel 12's navigation (or a specific value of low-load-side assumed loads) is an austenitic transformation finish stress or less of the shape memory alloy; and so that an assumed load (or a specific value of high-load-side assumed loads) during another part of the vessel 12's navigation is a martensitic transformation finish stress or more of the shape memory alloy.

Accordingly, the vessel 12 in which the smart vortex generators 1 are disposed on the hull 13's surface is such that the main body 3's vortex generating portion 7 turns into an optimum or satisfactory rise posture (or the form of the main body 3 turns into an optimum or satisfactory first form) in a part during the vessel 12's navigation (or within a load range where a fluidic force of fluid becomes a low-load-side assumed load or less, for instance), thereby demonstrating an optimum or satisfactory separation suppressing function. Thus, the main body 3's vortex generating portion 7 generates vortexes on the hull 13's surface, thereby inhibiting flows from separating from the hull 13's surface effectively.

And, in the other part during the vessel 12's navigation (or within a load range where the fluidic force of fluid becomes a high-load-side assumed load or more, for instance), the main body 3's vortex generating portion 7 turns into an optimum inclined posture in such a state that it inclines from the rise posture to lie down so as to be superimposed over along the hull 13' surface, or such a satisfactory inclined posture that it inclines from the rise posture by a predetermined magnitude, (or the form of the main body 3 turns into an optimum or satisfactory second form), thereby demonstrating an optimum or satisfactory turbulent-flow suppressing function.

Embodiment Mode 11

This Embodiment Mode 11 is one which relates to a smart vortex generator demonstrating a bidirectional characteristic by means of a combination of a super-elastic effect of shape memory alloy and a fluidic force. Moreover, this embodiment mode is one in which the smart vortex generator according to the present invention is applied to a turbo pump, a rotary machine.

Similarly to Embodiment Mode 9, this embodiment mode is one in which, in said Embodiment Mode 5, the type of the shape memory alloy, which constitutes the main body 3 in the smart vortex generator 1 shown in FIG. 11, is altered.

A shape memory alloy, which constitutes the main body 3 in this embodiment mode, is such that it is possible to employ one which turns into a low-load-side stable phase (or an austenitic phase, for instance) during a part of the turbo pump 14's operation (or within a load range where a fluidic force of fluid becomes a low-load-side assumed load or less); and which turns into a high-load-side stable phase (or a martensitic phase (or a stress-induced martensitic phase), for instance) during the other part of the turbo pump 14's operation (or within a load range where the fluidic force of fluid becomes a high load-side assumed load or more); in the service conditions of the smart vortex generator 1 according to the present embodiment mode. For example, this shape memory alloy is such that it is possible to adjust the alloy composition (or components or combining ratios) or heat treatment conditions, and the like, so that an assumed load during a part of the turbo pump 14's operation (or a specific value of low-load-side assumed loads) is an austenitic transformation finish stress or less of the shape memory alloy; and so that an assumed load (or a specific value of high-load-side assumed loads) during the other part of the turbo pump 14's operation is a martensitic transformation finish stress or more of the shape memory alloy.

Accordingly, the turbo pump 14 in which the smart vortex generators 1 are disposed on the surface of the impeller blades 15 is such that the main body 3's vortex generating portion 7 turns into an optimum or satisfactory rise posture (or the form of the main body 3 turns into an optimum or satisfactory first form) in a part during operation (or within a load range where a fluidic force of fluid becomes a low-load-side assumed load or less, for instance), thereby demonstrating an optimum or satisfactory separation suppressing function. Thus, the main body 3's vortex generating portion 7 generates vortexes on the surface of the impeller blades 14, thereby inhibiting flows from separating from the surface of the impeller blades 14 effectively.

And, in the other part during the turbo pump 14's operation (or within a load range where the fluidic force of fluid becomes a high-load-side assumed load or more, for instance), the main body 3's vortex generating portion 7 turns into an optimum inclined posture in such a state that it inclines from the rise posture to lie down so as to be superimposed over along the surface of the impeller blades 14, or such a satisfactory inclined posture that it inclines from the rise posture by a predetermined magnitude, (or the form of the main body 3 turns into an optimum or satisfactory second form), thereby demonstrating an optimum or satisfactory turbulent-flow suppressing function.

Note that, in said Embodiment Modes 9 through 11, although an example has been described, example in which said shape memory alloy turns into an austenitic phase when a fluidic force of fluid becomes a low-load-side assumed load or less, and thereby the main body 3 maintains the first form; and said shape memory alloy turns into a martensitic phase when the fluidic force of fluid becomes a high-load-side assumed load or more, and thereby the main body 3 maintains the second form; on the contrary, it is advisable as well to adapt it so that said shape memory alloy turns into a martensitic phase when a fluidic force of fluid becomes a high-load-side assumed load or more, and thereby the main body 3 maintains the first form; and so that said shape memory alloy turns into an austenitic phase when the fluidic force of fluid becomes a low-load-side assumed load or less, and thereby the main body 3 maintains the second form.

Figure 17:
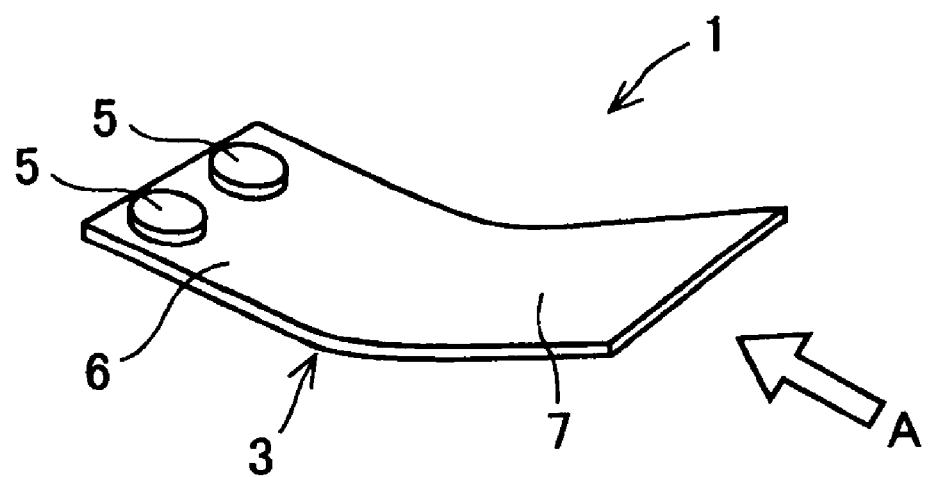
FIG. 17 is directed to Embodiment Modes 9 through 11, and is a perspective view for illustrating an example in which a smart vortex generator's placement direction is altered with respect to the flow direction of fluid.
Figure 18:
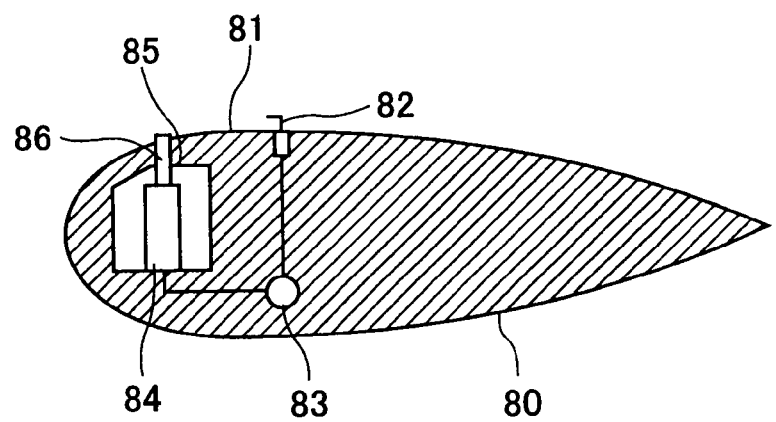
FIG. 18 is a cross-sectional view for illustrating a conventional vortex generator.
Figure 19:
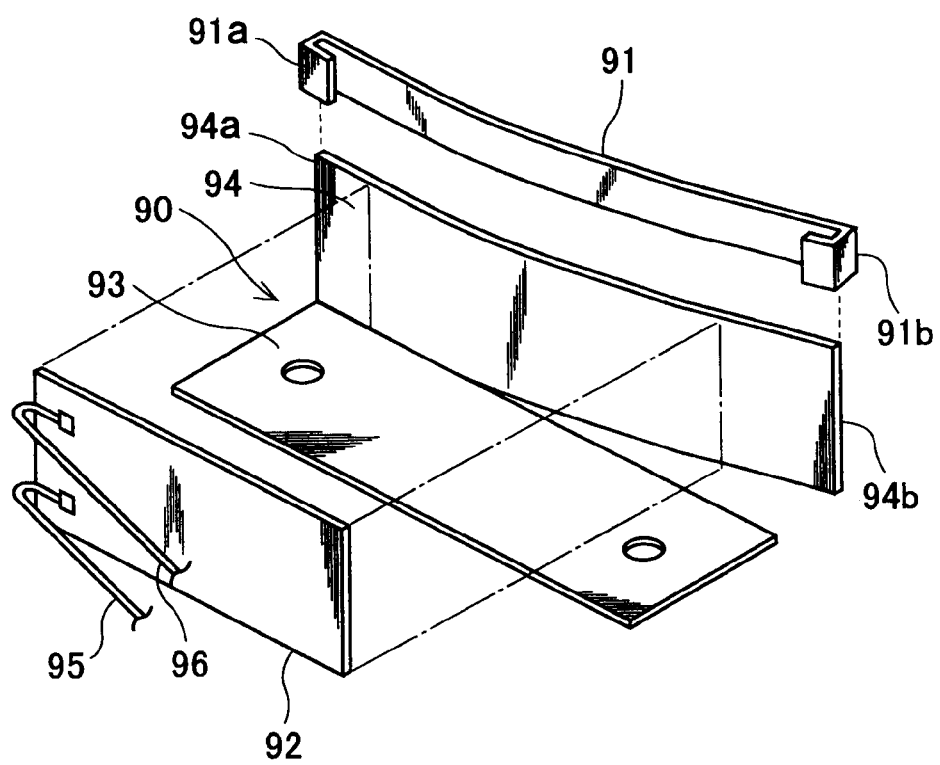
FIG. 19 is an exploded perspective view for illustrating another conventional vortex generator.

Moreover, in said Embodiment Modes 9 through 11, when they are configured so that the main body 3 maintains the first form when a fluidic force of fluid becomes a high-load-side assumed load or more; and so that the main body 3 maintains the second form when the fluidic force of fluid becomes a low-load-side assumed load or less, it is preferable to place the vortex generators 1 so that the main body 3's base portion 6, and the like, extend substantially parallelly with respect to a flow direction of fluid (or the arrowheaded direction A in FIG. 17); and so that the flow of fluid runs into the plate surface of the vortex generating portion 7 of the main body 3 (or a rear-side surface, the main body 3's flexed convex side or curved convex side), which is put into the first form and the second form; with respect to the flow direction of fluid, as shown in FIG. 17.

Further, in said Embodiment Modes 9 through 11, although an example has been described, example in which the form of the main body 3 changes between the first form and the second form by means of a combination of the shape memory alloy's super-elastic effect and the fluidic force, it is also possible to change the form of the main body 3 between the first form and the second form by means of a shape memory alloy's super-elastic effect, a fluidic force, and a supplementary force (or an elastic force, or a force resulting from a fluidic pressure or a weight, and the like), which is loaded thereto supplementally by means of supplementary force giving means. For example, in the smart vortex generators 1 being directed to said Embodiment Modes 1 through 4 that are equipped with the blade spring 4, by means of employing one which exhibits a predetermined super-elastic effect for the shape memory alloy that constitutes the main body 3, and additionally by means of appropriately setting the blade spring 4's spring force, it is possible to change the form of the main body 3 between the first form and the second form by means of the shape memory alloy's super-elastic effect, the fluidic force, and the spring force as a supplementary force being loaded thereto supplementally.

Embodiment Mode 12

This Embodiment Mode 12 is one which relates to a smart vortex generator demonstrating a bidirectional characteristic by means of a combination of a super-elastic effect of super-elastic alloy and a fluidic force. Moreover, this embodiment mode is one in which the smart vortex generator according to the present invention is applied to an airplane, an aircraft.

This embodiment mode is one in which, in said Embodiment Mode 5, the shape memory alloy, which constitutes the main body 3 in the smart vortex generator 1 shown in FIG. 11, is altered to a super-elastic alloy (or an alloy undergoing a super-elastic deformation in an elastic strain magnitude of 1% or more (or 2% or more preferably) without being accompanied by any phase transformation).

A super-elastic alloy, which constitutes the main body 3 in this embodiment mode, is one which exhibits a predetermined super-elastic effect; and, in the service conditions of the smart vortex generator 1 according to the present embodiment mode, it is such that the alloy composition (or components or combining ratios) or heat treatment conditions, and the like, are adjusted so that, when a fluidic force, which acts onto the main body 3 from the arrowheaded direction A in FIG. 11 during flying is smaller than an assumed fluidic force upon the airplane 2's takeoff and landing (or a specific value of low-load-side assumed loads), the main body 3 maintains said first form; and so that, when the fluidic force, which acts onto the main body 3 from the arrowheaded direction A in FIG. 11 during flying is greater than an assumed fluidic force (or a specific value of high-load-side assumed loads) upon the airplane 2's cruising, the super-elastic alloy undergoes a super-elastic deformation, and thereby the main body 3 maintains said second form.

Specifically, in the smart vortex generator 1 according to the present embodiment mode, while taking the assumed loads upon takeoff and landing and upon cruising into account, the stress-strain characteristic of the super-elastic alloy, which constitutes the main body 3, is set so as to effect as follows. When a fluidic force of fluid is the low-load-side assumed load or less, that is, in at least a part when the airplane 2, in which the smart vortex generators 1 are installed on the main wing 2a's top surface, takes off and lands (or in a part of the takeoff and landing process, when the fluidic force is on a lower side), the main body 3's vortex generating portion 7 turns into an optimum or satisfactory rise posture (or the form of the main body 3 turns into an optimum or satisfactory first form) as shown in FIG. 11, and thereby it is capable of demonstrating an optimum or satisfactory separation suppressing function; and so that, during the same airplane 2's cruising (or when the fluidic force of fluid is the high-load-side assumed load or more), the main body 3's vortex generating portion 7 turns into an optimum inclined posture in such a state that it inclines from the rise posture to lie down so as to be superimposed over along the main wing 2a's surface, or such a satisfactory inclined posture that it inclines from the rise posture by a predetermined magnitude, (or the form of the main body 3 turns into an optimum or satisfactory second form), and thereby it is capable of demonstrating an optimum or satisfactory turbulent-flow suppressing function. Note that, since the fluidic force, which acts onto the main body 3 from the arrowheaded direction A in FIG. 11 during flying, changes due to airplane's airspeed or angle of attack, and the like, it is necessary to appropriately set the super-elastic alloy's stress-strain characteristic while further taking this into consideration.

Note that, in the present embodiment mode, such a case is assumed that the airplane 2's airspeed is faster upon cruising than it is upon takeoff and landing; and that a fluidic force of fluid, which acts onto the main body 3 from the arrowheaded direction A in FIG. 11 during flying, is greater by a predetermined magnitude upon cruising than the one upon takeoff and landing.

Moreover, the super-elastic alloy is such that the stress-strain characteristic does not change greatly due to temperature. Accordingly, the smart vortex generator, which demonstrates a bidirectional characteristic by means of a combination of a super-elastic effect of super-elastic alloy and a fluidic force, can be applied either to a case where there is a great difference between a fluidic temperature upon the airplane 2's takeoff and landing and a fluidic temperature upon the airplane 2's cruising, or to a case where there is no great difference between them.

Therefore, in this smart vortex generator 1, it is not necessary to dispose any auxiliary-force giving means separately, and thereby it contributes more to simplifying the structure and making it maintenance free because of the reduction of constituent component parts.

Since the other constructions and operations/effects are the same as those of said Embodiment Modes 1 and 5, their descriptions are omitted herein by making reference to the explanations on said Embodiment Modes 1 and 5.

Embodiment Mode 13

This Embodiment Mode 13 is one which relates to a smart vortex generator demonstrating a bidirectional characteristic by means of a combination of a super-elastic effect of super-elastic alloy and a fluidic force. Moreover, this embodiment mode is one in which the smart vortex generator according to the present invention is applied to a vessel.

Similarly to Embodiment Mode 12, this embodiment mode is one in which, in said Embodiment Mode 5, the shape memory alloy, which constitutes the main body 3 in the smart vortex generator 1 shown in FIG. 11, is altered to a super-elastic alloy (or an alloy undergoing a super-elastic deformation in an elastic strain magnitude of 1% or more (or 2% or more preferably) without being accompanied by any phase transformation).

A super-elastic alloy, which constitutes the main body 3 in this embodiment mode, is one which exhibits a predetermined super-elastic effect; and, in the service conditions of the smart vortex generator 1 according to the present embodiment mode, it is such that the alloy composition (or components or combining ratios) or heat treatment conditions, and the like, are adjusted so that, in a part during the vessel 12's navigation (or within a load range where a fluidic force, which acts onto the main body 3 from the arrowheaded direction A in FIG. 11 becomes a low-load-side assumed load or less), the main body 3 maintains said first form; and so that, in the other part during the vessel 12's navigation (or within a load range where the fluidic force, which acts onto the main body 3 from the arrowheaded direction A in FIG. 11 becomes a high-load-side assumed load or more), the super-elastic alloy undergoes a super-elastic deformation, and thereby the main body 3 maintains said second form.

Accordingly, the vessel 12 in which the smart vortex generators 1 are disposed on the hull 13's surface is such that the main body 3's vortex generating portion 7 turns into an optimum or satisfactory rise posture (or the form of the main body 3 turns into an optimum or satisfactory first form) in said part during the vessel 12's navigation, thereby demonstrating an optimum or satisfactory separation suppressing function. Thus, the main body 3's vortex generating portion 7 generates vortexes on the hull 13's surface, thereby inhibiting flows from separating from the hull 13's surface effectively.

And, in said other part during the vessel 12's navigation, the main body 3's vortex generating portion 7 turns into an optimum inclined posture in such a state that it inclines from the rise posture to lie down so as to be superimposed over along the hull 13's surface, or such a satisfactory inclined posture that it inclines from the rise posture by a predetermined magnitude, (or the form of the main body 3 turns into an optimum or satisfactory second form), thereby demonstrating an optimum or satisfactory turbulent-flow suppressing function.

Embodiment Mode 14

This Embodiment Mode 14 is one which relates to a smart vortex generator demonstrating a bidirectional characteristic by means of a combination of a super-elastic effect of super-elastic alloy and a fluidic force. Moreover, this embodiment mode is one in which the smart vortex generator according to the present invention is applied to a turbo pump, a rotary machine.

Similarly to Embodiment Mode 12, this embodiment mode is one in which, in said Embodiment Mode 5, the shape memory alloy, which constitutes the main body 3 in the smart vortex generator 1 shown in FIG. 11, is altered to a super-elastic alloy (or an alloy undergoing a super-elastic deformation in an elastic strain magnitude of 1% or more (or 2% or more preferably) without being accompanied by any phase transformation).

A super-elastic alloy, which constitutes the main body 3 in this embodiment mode, is one which exhibits a predetermined super-elastic effect; and, in the service conditions of the smart vortex generator 1 according to the present embodiment mode, it is such that the alloy composition (or components or combining ratios) or heat treatment conditions, and the like, are adjusted so that, in a part during the turbo pump 14's operation (or within a load range where a fluidic force of fluid, which acts onto the main body 3 from the arrowheaded direction A in FIG. 11 becomes a low-load-side assumed load or less), the main body 3 maintains said first form; and so that, in the other part during the turbo pump 14's operation (or within a load range where the fluidic force of fluid, which acts onto the main body 3 from the arrowheaded direction A in FIG. 11 becomes a high-load-side assumed load or more), the super-elastic alloy undergoes a super-elastic deformation, and thereby the main body 3 maintains said second form.

Accordingly, the turbo pump 14 in which the smart vortex generators 1 are disposed on the impeller blades 15's surface is such that the main body 3's vortex generating portion 7 turns into an optimum or satisfactory rise posture (or the form of the main body 3 turns into an optimum or satisfactory first form) in said part during the turbo pump 14's operation, thereby demonstrating an optimum or satisfactory separation suppressing function. Thus, the main body 3's vortex generating portion 7 generates vortexes on the impeller blades 15's surface, thereby inhibiting flows from separating from the impeller blades 15's surface effectively.

And, in said other part during the turbo pump 14's operation, the main body 3's vortex generating portion 7 turns into an optimum inclined posture in such a state that it inclines from the rise posture to lie down so as to be superimposed over along the impeller blades 15's surface, or such a satisfactory inclined posture that it inclines from the rise posture by a predetermined magnitude, (or the form of the main body 3 turns into an optimum or satisfactory second form), thereby demonstrating an optimum or satisfactory turbulent-flow suppressing function.

Note that, in said Embodiment Modes 12 through 14, although an example has been described, example in which the main body 3 comprising said super-elastic alloy maintains the first form when a fluidic force of fluid becomes a low-load-side assumed load or less; and said super-elastic alloy undergoes a super-elastic deformation when the fluidic force of fluid becomes a high-load-side assumed load or more, and thereby the main body 3 maintains the second form; on the contrary, it is advisable as well to adapt it so that said super-elastic alloy undergoes a super-elastic deformation when a fluidic force of fluid becomes a high-load-side assumed load or more, and thereby the main body 3 maintains the first form; and the main body 3 maintains the second form when the fluidic force of fluid becomes a low-load-side assumed load or less.

Moreover, in said Embodiment Modes 12 through 14, when they are configured so that the main body 3 maintains the first form when a fluidic force of fluid becomes a high-load-side assumed load or more; and so that the main body 3 maintains the second form when the fluidic force of fluid becomes a low-load-side assumed load or less, it is preferable to place the vortex generators 1 so that the main body 3's base portion 6, and the like, extend substantially parallelly with respect to a flow direction of fluid (or the arrowheaded direction A in FIG. 17); and so that the flow of fluid runs into the plate surface of the vortex generating portion 7 of the main body 3 (or a rear-side surface, the main body 3's flexed convex side or curved convex side), which is put into the first form and the second form; with respect to the flow direction of fluid, as shown in FIG. 17.

Further, in said Embodiment Modes 12 through 14, although an example has been described, example in which the form of the main body 3 changes between the first form and the second form by means of a combination of the super-elastic alloy's super-elastic effect and the fluidic force, it is also possible to change the form of the main body 3 between the first form and the second form by means of a super-elastic alloy's super-elastic effect, a fluidic force, and a supplementary force (or an elastic force, or a force resulting from a fluidic pressure or a weight, and the like), which is loaded thereto supplementally by means of supplementary force giving means. For example, in the smart vortex generators 1 being directed to said Embodiment Modes 1 through 4 that are equipped with the blade spring 4, by means of employing a super-elastic alloy, which exhibits a predetermined super-elastic effect, instead of the shape memory alloy that constitutes the main body 3, and additionally by means of appropriately setting the blade spring 4's spring force, it is possible to change the form of the main body 3 between the first form and the second form by means of the super-elastic alloy's super-elastic effect, the fluidic force, and the spring force as a supplementary force being loaded thereto supplementally.

The invention claimed is:

1. A smart vortex generator to be placed on a body surface, which makes a boundary to a flow of fluid, thereby suppressing a flow separation, which occurs at the body surface, and thereby demonstrating a multi-directional characteristic depending on a temperature change of the fluid, the smart vortex generator comprising:
   a main body disposed on the body surface, at least a part of the main body comprising a shape memory alloy; and
   the smart vortex generator is configured so that, depending on a temperature increment/decrement of the fluid, a form of the main body changes between (1) a first form, which is capable of suppressing a flow separation by a vortex generation, and (2) a second form, which is capable of suppressing a turbulent flow, by a phenomenon that the shape memory alloy undergoes a phase transformation between a high-temperature-side stable phase, which is stable on a higher temperature side, and a low-temperature-side stable phase, which is stable on a lower temperature side.

2. The smart vortex generator set forth in claim 1, wherein: the shape memory alloy exhibits a one-way shape memory effect;
   the smart vortex generator further includes auxiliary-force giving means disposed in a predetermined relationship with respect to the main body, and giving a predetermined auxiliary force, as at least a part of a bias force required for demonstration of the multi-directional characteristic, to the shape memory alloy; and
   the smart vortex generator is further configured so that, when a temperature of the fluid reaches a transformation start temperature of the shape memory alloy in the temperature decrement process, the shape memory alloy is put in such a state that the shape memory alloy receives an external load acting onto the shape memory alloy in service, the shape memory alloy starts transforming from the high-temperature-side stable phase to the low-temperature-side stable phase, and so that, when the temperature of the fluid reaches a reverse transformation start temperature of the shape memory alloy in the temperature increment process, the shape memory alloy is put in such a state that the shape memory alloy receives the external load, the shape memory alloy starts transforming reversely from the low-temperature-side stable phase to the high-temperature-side stable phase.

3. The smart vortex generator set forth in claim 2, wherein the smart vortex generator is further configured so that, when the temperature of the fluid is a reverse transformation finish temperature or more of the shape memory alloy, which is put in such a state that the shape memory alloy receives the external load, the main body maintains the first form; and so that, when the temperature of the fluid is a transformation finish temperature or less of the shape memory alloy, which is put in such a state that the shape memory alloy receives the external load, the main body maintains the second form.

4. The smart vortex generator set forth in claim 2, wherein the smart vortex generator is further configured so that, when the temperature of the fluid is a transformation finish temperature or less of the shape memory alloy, which is put in such a state that the shape memory alloy receives the external load, the main body maintains the first form; and so that, when the temperature of the fluid is a reverse transformation finish temperature or more of the shape memory alloy, which is put in such a state that the shape memory alloy receives the external load, the main body maintains the second form.

5. The smart vortex generator set forth in claim 2, wherein the auxiliary-force giving means includes an elastic body for giving an elastic force, as the auxiliary force, to the shape memory alloy.

6. The smart vortex generator set forth in claim 5, wherein the elastic body includes a blade spring.

7. The smart vortex generator set forth in claim 1, wherein:
   the shape memory alloy exhibits a one-way shape memory effect;
   the main body is configured so that a fluidic force of the fluid, as a bias force required for demonstration of the multi-directional characteristic, is given to the shape memory alloy from a predetermined direction; and
   the smart vortex generator is further configured so that, when the temperature of the fluid reaches a transformation start temperature of the shape memory alloy in a temperature decrement process, the shape memory alloy is put in such a state that the shape memory alloy receives an external load acting onto the shape memory alloy in service, the shape memory alloy starts transforming from the high-temperature-side stable phase to the low-temperature-side stable phase; and so that, when the temperature of the fluid reaches a reverse transformation start temperature of the shape memory alloy in a temperature increment process, the shape memory alloy is put in such a state that the shape memory alloy receives the external load, the shape memory alloy starts transforming reversely from the low-temperature-side stable phase to the high-temperature-side stable phase.

8. The smart vortex generator set forth in claim 7, wherein the smart vortex generator is further configured so that, when the temperature of the fluid is a reverse transformation finish temperature or more of the shape memory alloy, which is put in such a state that the shape memory alloy receives the external load, the main body maintains the first form; and so that, when the temperature of the fluid is a transformation finish temperature or less of the shape memory alloy, which is put in such a state that the shape memory alloy receives the external load, the main body maintains the second form.

9. The smart vortex generator set forth in claim 7, wherein the smart vortex generator is further configured so that, when the temperature of the fluid is a transformation finish temperature or less of the shape memory alloy, which is put in such a state that the shape memory alloy receives the external load, the main body maintains the first form; and so that, when the temperature of the fluid is a reverse transformation finish temperature or more of the shape memory alloy, which is put in such a state that the shape memory alloy receives the external load, the main body maintains the second form.

10. The smart vortex generator set forth in claim 1, wherein the smart vortex generator is further configured so that the shape memory alloy exhibits a multi-directional shape memory effect; and the form of the main body changes between the first form and the second form by the multi-directional shape memory effect at least.

11. The smart vortex generator set forth in claim 10, wherein the smart vortex generator is further configured so that, when the temperature of the fluid is a reverse transformation finish temperature or more of the shape memory alloy, which is put in such a state that the shape memory alloy receives an external load acting onto the shape memory alloy in service, the main body maintains the first form, a high-temperature-side shape-memorized configuration; and so that, when the temperature of the fluid is a transformation finish temperature or less of the shape memory alloy, which is put in such a state that the shape memory alloy receives the external load, the main body maintains the second form, a low-temperature-side shape-memorized configuration.

12. The smart vortex generator set forth in claim 10, wherein the smart vortex generator is further configured so that, when the temperature of the fluid is a transformation finish temperature or less of the shape memory alloy, which is put in such a state that the shape memory alloy receives the external load, the main body maintains the first form, a low-temperature-side shape-memorized configuration; and so that, when the temperature of the fluid is a reverse transformation finish temperature or more of the shape memory alloy, which is put in such a state that the shape memory alloy receives the external load, the main body maintains the second form, a high-temperature-side shape-memorized configuration.

13. The smart vortex generator set forth in claim 1, wherein the main body includes:
 a base portion fixed onto the body surface; and
 a vortex generating portion rising in a predetermined rise posture with respect to the base portion to demonstrate a flow-separation suppressing function when the main body is put into the first form, and additionally turning into a predetermined inclined posture with respect to the base portion to demonstrate a turbulent-flow suppressing function when the main body is put into the second form.

14. The smart vortex generator set forth in claim 13, wherein the main body comprises:
 a plate-shaped body in which the base portion and the vortex generating portion, which rises at a predetermined rise angle with respect to the base portion by curving or bending from an end periphery of the base portion, are formed integrally; and
 at least a curved portion or a bent portion, and the boundary portion between the base portion and the vortex generating portion, comprises the shape memory alloy or the super-elastic alloy.

15. The smart vortex generator set forth in claim 13, wherein:
 the shape memory alloy exhibits a one-way shape memory effect; and
 the shape memory alloy is subjected to a shape-memorizing treatment so that the vortex generating portion rises at a predetermined rise angle with respect to the base portion by curving or bending from the base portion.

16. The smart vortex generator set forth in claim 13, wherein:
 the shape memory alloy exhibits a one-way shape memory effect; and
 the shape memory alloy is subjected to a shape-memorizing treatment so that the vortex generating portion turns into a predetermined inclined posture in which the vortex generating portion inclines in a direction of lessening a rise angle with respect to the base portion.

17. The smart vortex generator set forth in claim 13, wherein:
 the shape memory alloy exhibits a multi-directional shape memory effect; and
 the shape memory alloy is subjected to a shape-memorizing treatment so that the vortex generating portion rises at a predetermined rise angle with respect to the base portion by curving or bending from the base portion, and the shape memory alloy is subjected to a shape-memorizing treatment so that the vortex generating portion turns into a predetermined inclined posture in which the vortex generating portion inclines in a direction of lessening the rise angle.

18. An aircraft comprising:
 the smart vortex generator set forth in claim 1, on a wing surface thereof,
 wherein the main body is configured to maintain the first form during at least a part of takeoff and landing, and to maintain the second form during cruising.

19. A vessel, wherein the smart vortex generator set forth in claim 1 is disposed on a hull surface thereof, or on a surface of a wing installed to a hull thereof.

20. A rotary machine, wherein the smart vortex generator set forth in claim 1 is disposed on a wing surface thereof.

21. A smart vortex generator to be placed on a body surface which makes a boundary to a flow of fluid, wherein the temperature of the flow of fluid is different for at least two operational states of the body surface, the smart vortex generator comprising:
 a main body to be disposed on the body surface, at least a part of the main body comprising a super-elastic shape memory alloy exhibiting a shape memory effect between a first form of the main body which is capable of suppressing a flow separation by a vortex generation in the fluid when the main body is at a temperature higher than a phase transformation temperature, and a second form of the main body which is capable of suppressing a turbulent flow of the fluid when the main body is at a temperature lower than a phase transformation temperature; and auxiliary-force giving means disposed in a predetermined relationship with respect to the main body and giving a predetermined auxiliary force to the main body in the first form of the main body, as at least a part of a bias force required for demonstration of a multi-directional characteristic, wherein the phase transformation characteristics of the super-elastic alloy are such that the bias force will cause a phase transformation of the shape memory alloy from the first form to the second form, and from the second form to the first form, as a result of the temperature difference of the fluid between the two operational states of the body surface.

* * * * *